US009352839B2

(12) United States Patent
Gehret et al.

(10) Patent No.: US 9,352,839 B2
(45) Date of Patent: May 31, 2016

(54) ACTIVE POSITIONING AIRBAG ASSEMBLY AND ASSOCIATED SYSTEMS AND METHODS

(71) Applicant: AmSafe, Inc., Phoenix, AZ (US)

(72) Inventors: William J. Gehret, Chandler, AZ (US); Daniel Nick Foubert, Maricopa, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 14/505,277

(22) Filed: Oct. 2, 2014

(65) Prior Publication Data

US 2016/0096627 A1      Apr. 7, 2016

(51) Int. Cl.
*B64D 11/06* (2006.01)
*B60R 21/207* (2006.01)
*B60R 21/231* (2011.01)

(52) U.S. Cl.
CPC ........ *B64D 11/06205* (2014.12); *B60R 21/207* (2013.01); *B60R 2021/2074* (2013.01); *B60R 2021/23153* (2013.01)

(58) Field of Classification Search
CPC ............... B60R 2021/23153; B60R 21/207; B60R 2021/2074
USPC .......................................................... 280/735
See application file for complete search history.

(56) References Cited

U.S. PATENT DOCUMENTS

| | | | |
|---|---|---|---|
| 2,502,206 | A | 3/1950 | Creek |
| 3,430,979 | A | 3/1969 | Terry et al. |
| 3,560,027 | A | 2/1971 | Graham |
| 3,586,347 | A | 6/1971 | Carey et al. |
| 3,603,535 | A | 9/1971 | DePolo |
| 3,682,498 | A | 8/1972 | Rutzki |
| 3,706,463 | A | 12/1972 | Lipkin |
| 3,730,583 | A | 5/1973 | Colovas et al. |

(Continued)

FOREIGN PATENT DOCUMENTS

| | | |
|---|---|---|
| CN | 1351710 A | 5/2002 |
| CN | 1750966 A | 3/2006 |

(Continued)

OTHER PUBLICATIONS

International Search Report and Written Opinion; International Patent Application No. PCT/US2015/043082; Mailed: Jan. 11, 2016; Applicant: AmSafe, Inc.; 10 pages.

(Continued)

*Primary Examiner* — Darlene P Condra
(74) *Attorney, Agent, or Firm* — Perkins Coie LLP

(57) ABSTRACT

Airbag assemblies and associated systems and methods for use in aircraft and other vehicles are described herein that can provide crash protection for occupants seated in an upright position while not injuring or striking occupants in the brace position. An airbag system configured in accordance with an embodiment of the present technology can include an airbag configured to deploy through an opening of a housing during a crash event. The housing can be affixed to a seat or other interior portion (e.g., a fixed portion) of an aircraft forward of a passenger seat. The airbag can initially deploy in a direction away from an occupant in the seat and then move into position between a potential strike hazard and the occupant such that the airbag system can be used to protect occupants seated in an upright position while not injuring occupants in the brace position.

23 Claims, 21 Drawing Sheets

(56) References Cited

U.S. PATENT DOCUMENTS

| | | | |
|---|---|---|---|
| 3,756,620 A | 9/1973 | Radke | |
| 3,766,612 A | 10/1973 | Hattori | |
| 3,801,156 A | 4/1974 | Granig | |
| 3,820,842 A | 6/1974 | Stephenson | |
| 3,841,654 A | 10/1974 | Lewis | |
| 3,865,398 A | 2/1975 | Woll | |
| 3,866,940 A | 2/1975 | Lewis | |
| 3,888,503 A | 6/1975 | Hamilton | |
| 3,888,505 A * | 6/1975 | Shibamoto | 280/738 |
| 3,897,081 A | 7/1975 | Lewis | |
| 3,905,615 A | 9/1975 | Schulman | |
| 3,933,370 A | 1/1976 | Abe et al. | |
| 3,948,541 A | 4/1976 | Schulman | |
| 3,970,329 A | 7/1976 | Lewis | |
| 3,971,569 A | 7/1976 | Abe et al. | |
| 4,107,604 A | 8/1978 | Bernier | |
| 4,437,628 A | 3/1984 | Schwartz | |
| 4,536,008 A | 8/1985 | Brown | |
| 4,565,535 A * | 1/1986 | Tassy | 441/118 |
| 4,611,491 A | 9/1986 | Brown et al. | |
| 4,657,516 A * | 4/1987 | Tassy | 441/125 |
| 4,722,573 A | 2/1988 | Komohara | |
| 4,765,569 A | 8/1988 | Higgins | |
| 4,842,299 A | 6/1989 | Okamura et al. | |
| 4,971,354 A | 11/1990 | Kim | |
| 4,987,783 A | 1/1991 | D'Antonio et al. | |
| 4,995,638 A | 2/1991 | Shinto et al. | |
| 4,995,640 A | 2/1991 | Saito | |
| 5,026,305 A | 6/1991 | Del Guidice et al. | |
| 5,062,662 A | 11/1991 | Cameron | |
| 5,062,663 A | 11/1991 | Satoh | |
| 5,161,821 A | 11/1992 | Curtis | |
| 5,162,006 A | 11/1992 | Yandle, II | |
| 5,183,288 A | 2/1993 | Inada et al. | |
| 5,184,844 A | 2/1993 | Goor | |
| 5,194,755 A | 3/1993 | Rhee et al. | |
| 5,199,739 A | 4/1993 | Fujiwara et al. | |
| 5,288,104 A | 2/1994 | Chen | |
| 5,299,827 A | 4/1994 | Igawa | |
| 5,301,902 A * | 4/1994 | Kalberer et al. | 244/121 |
| 5,324,071 A | 6/1994 | Gotomyo et al. | |
| 5,335,937 A | 8/1994 | Uphues et al. | |
| 5,335,939 A | 8/1994 | Kuriyama et al. | |
| 5,344,210 A | 9/1994 | Marwan et al. | |
| 5,375,875 A | 12/1994 | DiSalvo et al. | |
| 5,400,867 A | 3/1995 | Muller et al. | |
| 5,411,289 A | 5/1995 | Smith et al. | |
| 5,447,327 A | 9/1995 | Jarboe et al. | |
| 5,454,595 A | 10/1995 | Olson et al. | |
| 5,456,491 A | 10/1995 | Chen et al. | |
| 5,465,999 A | 11/1995 | Tanaka et al. | |
| 5,470,103 A | 11/1995 | Vaillancourt et al. | |
| 5,472,231 A | 12/1995 | France | |
| 5,473,111 A | 12/1995 | Hattori et al. | |
| 5,482,230 A | 1/1996 | Bird et al. | |
| 5,485,041 A | 1/1996 | Meister | |
| 5,492,360 A | 2/1996 | Logeman | |
| 5,492,361 A | 2/1996 | Kim | |
| 5,496,059 A | 3/1996 | Bauer | |
| 5,499,840 A | 3/1996 | Nakano | |
| 5,556,056 A | 9/1996 | Kalberer et al. | |
| 5,558,300 A | 9/1996 | Kalberer et al. | |
| 5,564,734 A | 10/1996 | Stuckle | |
| 5,597,178 A | 1/1997 | Hardin, Jr. | |
| 5,609,363 A | 3/1997 | Finelli | |
| 5,630,616 A | 5/1997 | McPherson | |
| 5,672,916 A | 9/1997 | Mattes et al. | |
| 5,734,318 A | 3/1998 | Nitschke et al. | |
| 5,738,368 A * | 4/1998 | Hammond et al. | 280/730.1 |
| 5,752,714 A | 5/1998 | Pripps et al. | |
| 5,758,900 A | 6/1998 | Knoll et al. | |
| 5,765,869 A | 6/1998 | Huber | |
| 5,772,238 A | 6/1998 | Breed et al. | |
| 5,802,479 A | 9/1998 | Kithil et al. | |
| 5,803,489 A | 9/1998 | Nusshor | |
| 5,839,753 A | 11/1998 | Yaniv et al. | |
| 5,851,055 A | 12/1998 | Lewis | |
| 5,863,065 A | 1/1999 | Boydston et al. | |
| 5,868,421 A | 2/1999 | Eyrainer | |
| 5,871,230 A | 2/1999 | Lewis | |
| 5,871,231 A | 2/1999 | Richards et al. | |
| 5,886,373 A | 3/1999 | Hosogi | |
| 5,906,391 A | 5/1999 | Weir et al. | |
| 5,911,434 A | 6/1999 | Townsend | |
| 5,921,507 A * | 7/1999 | Kalberer et al. | 244/234 |
| 5,924,726 A | 7/1999 | Pan | |
| 5,927,748 A | 7/1999 | O'Driscoll | |
| 5,927,754 A | 7/1999 | Patzelt et al. | |
| 5,947,513 A | 9/1999 | Lehto | |
| 5,975,565 A | 11/1999 | Cuevas | |
| 5,984,350 A | 11/1999 | Hagan et al. | |
| 5,988,438 A | 11/1999 | Lewis et al. | |
| RE36,587 E | 2/2000 | Tanaka et al. | |
| 6,019,388 A | 2/2000 | Okazaki et al. | |
| 6,042,139 A | 3/2000 | Knox | |
| RE36,661 E | 4/2000 | Tanaka et al. | |
| 6,059,312 A | 5/2000 | Staub et al. | |
| 6,065,772 A | 5/2000 | Yamamoto et al. | |
| 6,082,763 A | 7/2000 | Kokeguchi | |
| 6,113,132 A | 9/2000 | Saslecov | |
| 6,126,194 A | 10/2000 | Yaniv et al. | |
| 6,135,489 A | 10/2000 | Bowers | |
| 6,142,508 A | 11/2000 | Lewis | |
| 6,142,511 A | 11/2000 | Lewis | |
| 6,149,231 A * | 11/2000 | Wustholz | 297/216.12 |
| 6,155,595 A | 12/2000 | Schultz | |
| 6,155,598 A | 12/2000 | Kutchey | |
| 6,158,765 A | 12/2000 | Sinnhuber | |
| 6,168,195 B1 | 1/2001 | Okazaki et al. | |
| 6,173,988 B1 | 1/2001 | Igawa | |
| 6,193,269 B1 | 2/2001 | Amamori | |
| 6,199,900 B1 * | 3/2001 | Zeigler | 280/735 |
| 6,206,411 B1 | 3/2001 | Sunabashiri | |
| 6,217,059 B1 | 4/2001 | Brown et al. | |
| 6,224,097 B1 | 5/2001 | Lewis | |
| 6,254,121 B1 | 7/2001 | Fowler et al. | |
| 6,254,130 B1 | 7/2001 | Jayaraman et al. | |
| 6,260,572 B1 | 7/2001 | Wu | |
| 6,276,714 B1 | 8/2001 | Yoshioka | |
| 6,293,582 B1 | 9/2001 | Lewis | |
| 6,325,412 B1 | 12/2001 | Pan | |
| 6,336,657 B1 | 1/2002 | Akaba et al. | |
| 6,378,896 B1 | 4/2002 | Sakakida et al. | |
| 6,378,898 B1 | 4/2002 | Lewis et al. | |
| 6,382,666 B1 | 5/2002 | Devonport | |
| 6,390,502 B1 | 5/2002 | Ryan et al. | |
| 6,398,254 B2 | 6/2002 | David et al. | |
| 6,406,058 B1 | 6/2002 | Devonport et al. | |
| 6,419,263 B1 | 7/2002 | Büsgen et al. | |
| 6,422,512 B1 | 7/2002 | Lewis et al. | |
| 6,425,601 B1 | 7/2002 | Lewis et al. | |
| 6,439,600 B1 | 8/2002 | Adkisson | |
| 6,442,807 B1 | 9/2002 | Adkisson | |
| 6,443,496 B2 | 9/2002 | Campau et al. | |
| 6,460,878 B2 | 10/2002 | Eckert et al. | |
| 6,547,273 B2 | 4/2003 | Grace et al. | |
| 6,557,887 B2 * | 5/2003 | Wohllebe | 280/730.1 |
| 6,585,289 B1 | 7/2003 | Hammer et al. | |
| 6,607,210 B2 | 8/2003 | Eckert et al. | |
| 6,616,177 B2 | 9/2003 | Thomas et al. | |
| 6,619,689 B2 | 9/2003 | Spencer et al. | |
| 6,648,367 B2 | 11/2003 | Breed et al. | |
| 6,669,229 B2 | 12/2003 | Thomas et al. | |
| 6,688,642 B2 | 2/2004 | Sollars, Jr. | |
| 6,705,641 B2 | 3/2004 | Schneider et al. | |
| 6,729,643 B1 | 5/2004 | Bassick et al. | |
| 6,739,264 B1 | 5/2004 | Hosey et al. | |
| 6,746,074 B1 | 6/2004 | Kempf et al. | |
| 6,749,220 B1 | 6/2004 | Wipasuramonton et al. | |
| 6,758,489 B2 | 7/2004 | Xu | |
| 6,764,097 B2 | 7/2004 | Kelley et al. | |
| 6,769,714 B2 | 8/2004 | Hosey et al. | |
| 6,776,434 B2 | 8/2004 | Ford et al. | |
| 6,779,813 B2 | 8/2004 | Lincoln | |

(56) References Cited

U.S. PATENT DOCUMENTS

| | | |
|---|---|---|
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,796,578 B2 | 9/2004 | White et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,837,079 B1 | 1/2005 | Takeuchi |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,843,503 B2 | 1/2005 | Ford |
| 6,846,005 B2 | 1/2005 | Ford et al. |
| 6,851,374 B1 | 2/2005 | Kelley et al. |
| 6,857,657 B2 | 2/2005 | Spangler et al. |
| 6,860,509 B2 | 3/2005 | Xu et al. |
| 6,863,301 B2 | 3/2005 | Ford et al. |
| 6,869,101 B2 | 3/2005 | White et al. |
| 6,871,872 B2 | 3/2005 | Thomas |
| 6,871,874 B2 | 3/2005 | Husby et al. |
| 6,874,812 B2 | 4/2005 | Keutz et al. |
| 6,874,814 B2 | 4/2005 | Hosey et al. |
| 6,877,771 B2 | 4/2005 | Weber |
| 6,882,914 B2 | 4/2005 | Gioutsos et al. |
| 6,886,856 B2 | 5/2005 | Canterberry et al. |
| 6,886,858 B2 | 5/2005 | Olson |
| 6,887,325 B2 | 5/2005 | Canterberry et al. |
| 6,894,483 B2 | 5/2005 | Pettypiece, Jr. et al. |
| 6,905,134 B2 | 6/2005 | Saiguchi et al. |
| 6,908,104 B2 | 6/2005 | Canterberry et al. |
| 6,923,483 B2 | 8/2005 | Curry et al. |
| 6,929,283 B2 | 8/2005 | Gioutsos et al. |
| 6,932,378 B2 | 8/2005 | Thomas |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,828 B2 | 10/2005 | Keeslar et al. |
| 6,962,363 B2 | 11/2005 | Wang et al. |
| 6,962,364 B2 | 11/2005 | Ju et al. |
| 6,966,576 B1 | 11/2005 | Greenstein |
| 6,974,154 B2 | 12/2005 | Grossert et al. |
| 6,983,956 B2 | 1/2006 | Canterberry et al. |
| 6,994,372 B2 | 2/2006 | Ford et al. |
| 7,007,973 B2 | 3/2006 | Canterberry et al. |
| 7,021,653 B2 | 4/2006 | Burdock et al. |
| 7,029,024 B2 | 4/2006 | Baumbach |
| 7,036,844 B2 | 5/2006 | Hammer et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann |
| 7,055,856 B2 | 6/2006 | Ford et al. |
| 7,063,350 B2 | 6/2006 | Steimke et al. |
| 7,070,203 B2 | 7/2006 | Fisher et al. |
| 7,081,692 B2 | 7/2006 | Pettypiece, Jr. et al. |
| 7,090,246 B2 | 8/2006 | Lincoln et al. |
| 7,107,133 B2 | 9/2006 | Fisher et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,134,691 B2 * | 11/2006 | Dunkle et al. ............ 280/743.2 |
| 7,147,245 B2 | 12/2006 | Flörsheimer et al. |
| 7,152,880 B1 | 12/2006 | Pang et al. |
| 7,163,236 B2 | 1/2007 | Masuda et al. |
| 7,198,285 B2 | 4/2007 | Hochstein-Lenzen |
| 7,198,293 B2 | 4/2007 | Olson |
| 7,213,836 B2 | 5/2007 | Coon et al. |
| 7,216,891 B2 | 5/2007 | Biglino |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,275,763 B2 | 10/2007 | Thomas et al. |
| 7,278,656 B1 | 10/2007 | Kalandek |
| 7,281,733 B2 | 10/2007 | Pieruch |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,360,791 B2 | 4/2008 | Yamada |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,431,332 B2 | 10/2008 | Wipasuramonton et al. |
| 7,452,002 B2 * | 11/2008 | Baumbach et al. ........ 280/743.2 |
| 7,506,891 B2 | 3/2009 | Quioc et al. |
| 7,513,524 B2 | 4/2009 | Oota et al. |
| 7,533,897 B1 | 5/2009 | Xu et al. |
| 7,557,052 B2 | 7/2009 | Konishi et al. |
| 7,594,675 B2 | 9/2009 | Bostrom et al. |
| 7,625,008 B2 | 12/2009 | Pang et al. |
| 7,648,167 B2 | 1/2010 | Bouquier et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,669,897 B2 | 3/2010 | Sano |
| 7,681,917 B2 | 3/2010 | Guillo et al. |
| 7,703,796 B2 | 4/2010 | Manire et al. |
| 7,708,312 B2 | 5/2010 | Kalandek |
| 7,740,274 B2 | 6/2010 | Manssart |
| 7,753,402 B2 | 7/2010 | Volkmann et al. |
| 7,789,418 B2 | 9/2010 | Wipasuramonton et al. |
| 7,837,223 B2 | 11/2010 | Shilliday et al. |
| 7,883,106 B2 | 2/2011 | Mical |
| 7,976,058 B2 | 7/2011 | Suzuki et al. |
| 7,980,590 B2 | 7/2011 | Foubert et al. |
| 8,210,566 B2 | 7/2012 | Fukawatase et al. |
| 8,267,424 B2 | 9/2012 | Tomitaka et al. |
| 8,414,018 B2 | 4/2013 | Choi et al. |
| 8,466,579 B2 | 6/2013 | Petitpierre |
| 8,523,220 B1 * | 9/2013 | Gehret et al. ............. 280/730.1 |
| 8,528,932 B2 | 9/2013 | Islam et al. |
| 8,556,291 B2 | 10/2013 | Islam et al. |
| 8,622,417 B1 * | 1/2014 | Schneider et al. ........... 280/729 |
| 8,657,334 B2 | 2/2014 | Mallinger et al. |
| 8,690,188 B2 | 4/2014 | Fiore |
| 8,727,061 B2 | 5/2014 | Rydsmo et al. |
| 8,740,244 B2 | 6/2014 | Obadia |
| 8,851,511 B1 | 10/2014 | Volkmann et al. |
| 8,882,141 B2 | 11/2014 | Arnold et al. |
| 8,894,095 B1 | 11/2014 | Meister et al. |
| 8,919,811 B2 | 12/2014 | Langer et al. |
| 8,939,465 B2 | 1/2015 | Kastelic et al. |
| 8,955,914 B2 | 2/2015 | Meister et al. |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |

(56) References Cited

U.S. PATENT DOCUMENTS

| | | |
|---|---|---|
| 2002/0067031 A1 | 6/2002 | Busgen et al. |
| 2002/0089152 A1 | 7/2002 | Khoudari et al. |
| 2002/0101067 A1 | 8/2002 | Breed |
| 2002/0125700 A1 | 9/2002 | Adkisson |
| 2002/0125701 A1 | 9/2002 | Devonport |
| 2002/0125705 A1 | 9/2002 | Wong et al. |
| 2002/0140209 A1 | 10/2002 | Waid et al. |
| 2003/0168837 A1 | 9/2003 | Schneider et al. |
| 2003/0178821 A1 | 9/2003 | Schneider et al. |
| 2004/0051280 A1 | 3/2004 | Anaya et al. |
| 2004/0164525 A1 | 8/2004 | Gray et al. |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0146119 A1 | 7/2005 | Ford et al. |
| 2005/0212270 A1 | 9/2005 | Wipasuramonton et al. |
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255569 A1 | 11/2006 | Weissert et al. |
| 2006/0255570 A1 | 11/2006 | Wipasuramonton et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0080528 A1 | 4/2007 | Itoga et al. |
| 2007/0085309 A1 | 4/2007 | Kelley et al. |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0170717 A1 | 7/2007 | Dirassuian |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2007/0246922 A1 | 10/2007 | Manssart |
| 2008/0018086 A1 | 1/2008 | Ford et al. |
| 2008/0054602 A1* | 3/2008 | Yang ................ 280/729 |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2008/0315567 A1* | 12/2008 | Fischer et al. ........... 280/732 |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0111341 A1 | 4/2009 | Rodriguez |
| 2009/0236828 A1 | 9/2009 | Foubert |
| 2010/0066060 A1 | 3/2010 | Kalandek |
| 2010/0102542 A1 | 4/2010 | Nakajima et al. |
| 2010/0115737 A1 | 5/2010 | Foubert |
| 2010/0164208 A1 | 7/2010 | Kalandek |
| 2010/0276540 A1 | 11/2010 | Rojo |
| 2011/0031723 A1* | 2/2011 | Fischer et al. ........... 280/730.1 |
| 2011/0049850 A1* | 3/2011 | Horikawa et al. ........ 280/736 |
| 2011/0285115 A1 | 11/2011 | Putala et al. |
| 2012/0091764 A1 | 4/2012 | Cailleteau et al. |
| 2012/0256399 A1* | 10/2012 | Kokeguchi ............... 280/729 |
| 2012/0256403 A1 | 10/2012 | Shields |
| 2012/0261911 A1 | 10/2012 | Baca et al. |
| 2013/0009430 A1* | 1/2013 | Islam et al. ............... 297/216.1 |
| 2013/0015642 A1 | 1/2013 | Islam et al. |
| 2013/0015686 A1 | 1/2013 | Islam et al. |
| 2013/0026803 A1* | 1/2013 | Islam et al. ............... 297/216.13 |
| 2013/0075524 A1 | 3/2013 | Islam et al. |
| 2013/0088056 A1* | 4/2013 | Quatanens et al. ....... 297/216.13 |
| 2013/0093221 A1 | 4/2013 | Ligonniere et al. |
| 2013/0106079 A1* | 5/2013 | Jarboe et al. ............. 280/730.1 |
| 2013/0106080 A1 | 5/2013 | Jarboe et al. |
| 2013/0187646 A1 | 7/2013 | Baca et al. |
| 2013/0197746 A1 | 8/2013 | Glueck et al. |
| 2013/0241180 A1 | 9/2013 | Gehret et al. |
| 2013/0307253 A1* | 11/2013 | Shin et al. ................ 280/728.2 |
| 2013/0307279 A1 | 11/2013 | De Morais et al. |
| 2013/0341975 A1* | 12/2013 | Schneider et al. ....... 297/163 |
| 2014/0027574 A1* | 1/2014 | Obadia et al. ............ 244/121 |
| 2014/0077478 A1 | 3/2014 | Islam et al. |
| 2014/0159356 A1 | 6/2014 | Kastelic et al. |
| 2015/0042078 A1 | 2/2015 | Gehret et al. |
| 2015/0232184 A1 | 8/2015 | Gehret et al. |

FOREIGN PATENT DOCUMENTS

| | | |
|---|---|---|
| DE | 4019596 A1 | 1/1992 |
| DE | 4116162 A1 | 11/1992 |
| DE | 4218252 A1 * | 12/1992 |
| DE | 4211209 A1 | 10/1993 |
| DE | 4329275 A1 | 3/1995 |
| DE | 19742151 | 4/1998 |
| DE | 19742151 A1 | 4/1998 |
| DE | 29912578 U1 | 5/2000 |
| DE | 10041042 A1 | 5/2001 |
| EP | 0639481 A1 | 2/1995 |
| EP | 0684168 A1 | 11/1995 |
| EP | 0765780 A1 | 4/1997 |
| EP | 1101660 A1 | 5/2001 |
| EP | 2028103 A2 | 2/2009 |
| EP | 2453556 A1 | 1/2013 |
| EP | 2546111 A1 | 1/2013 |
| EP | 2572994 A2 | 3/2013 |
| EP | 2636597 A2 | 9/2013 |
| EP | 2543557 B1 | 4/2014 |
| EP | 2596995 B1 | 9/2014 |
| FR | 2703011 A1 | 9/1994 |
| GB | 2306876 A | 5/1997 |
| GB | 2368050 A | 4/2002 |
| GB | 2410009 A | 7/2005 |
| JP | 63258239 A | 10/1988 |
| JP | 1083436 A | 3/1989 |
| JP | 6483436 | 3/1989 |
| JP | 11189117 A | 7/1999 |
| JP | 2011051413 A | 3/2011 |
| JP | 2011126381 A | 6/2011 |
| WO | 8807947 A1 | 10/1988 |
| WO | 9939940 A1 | 8/1999 |
| WO | 9942336 A1 | 8/1999 |
| WO | 0100456 A1 | 1/2001 |
| WO | 0168413 A1 | 9/2001 |
| WO | 2013012890 A1 | 1/2013 |
| WO | 2013019248 A2 | 2/2013 |
| WO | 2013128430 A1 | 9/2013 |
| WO | 2014024046 A2 | 2/2014 |

OTHER PUBLICATIONS

"Takata Melds Air Bag with Seat Belt," The Japan Times, Nov. 27, 2010, 1 page.

Federal Aviation Administration (FAA) policy statement PS-ANM-25-03, Technical Criteria for Approving Side-Facing Seats, dated Jun. 8, 2012.

Grierson et al., Simula's Line of Inflatable Restraint Technologies, TTCP Technical Report Proceedings of the Workshop: Inflatable Restraints in Aviation, May 2000, pp. 41-51.

Minicooper Manual dated 2006.

Renault Espce Manual dated 2002.

* cited by examiner

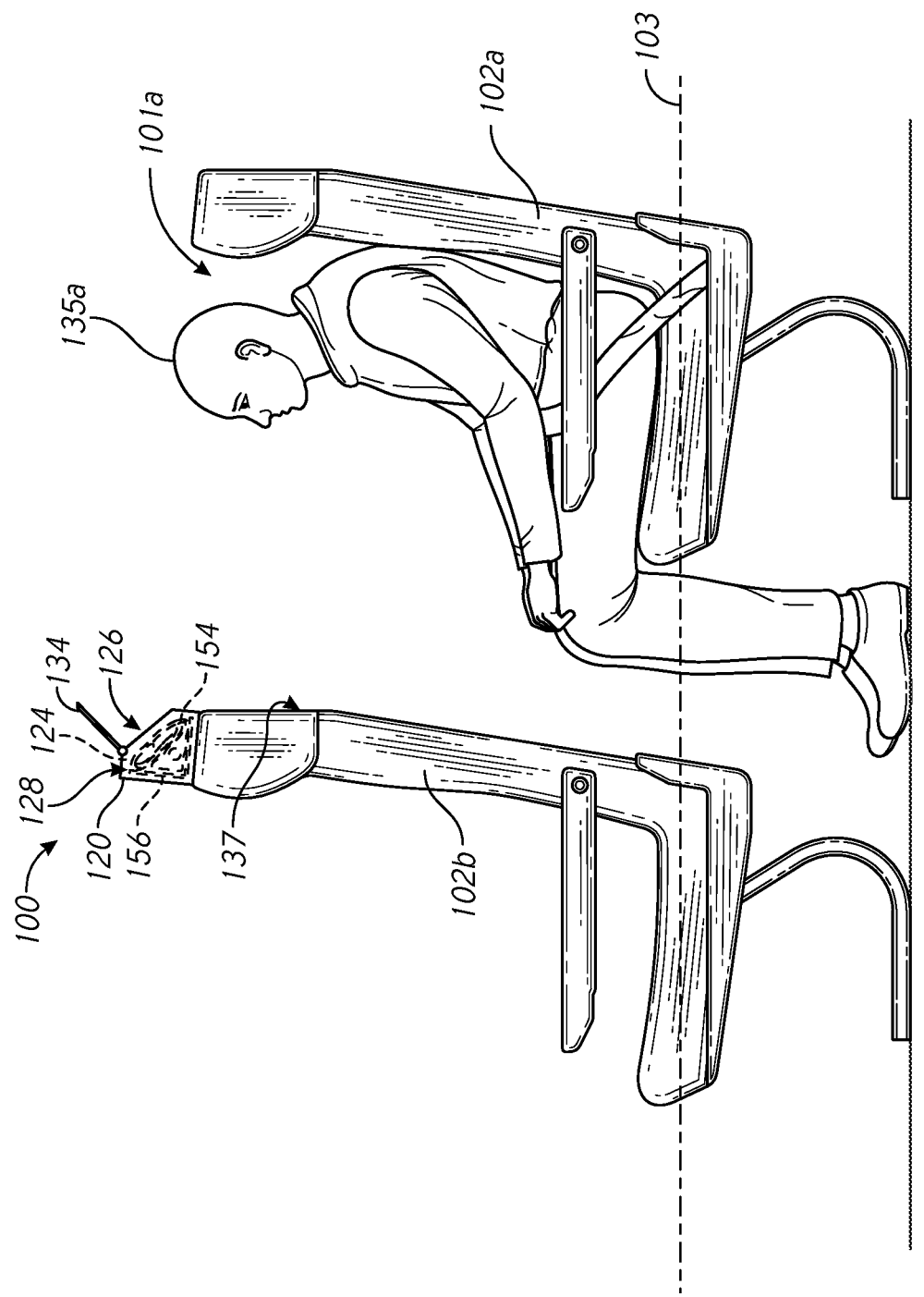

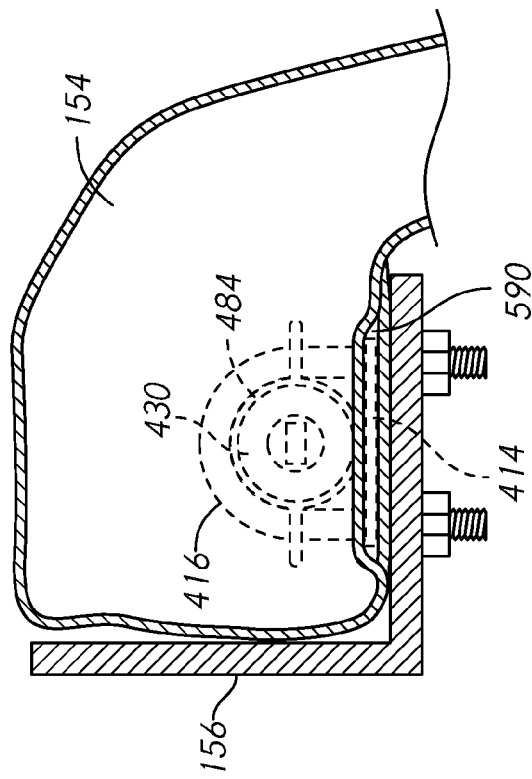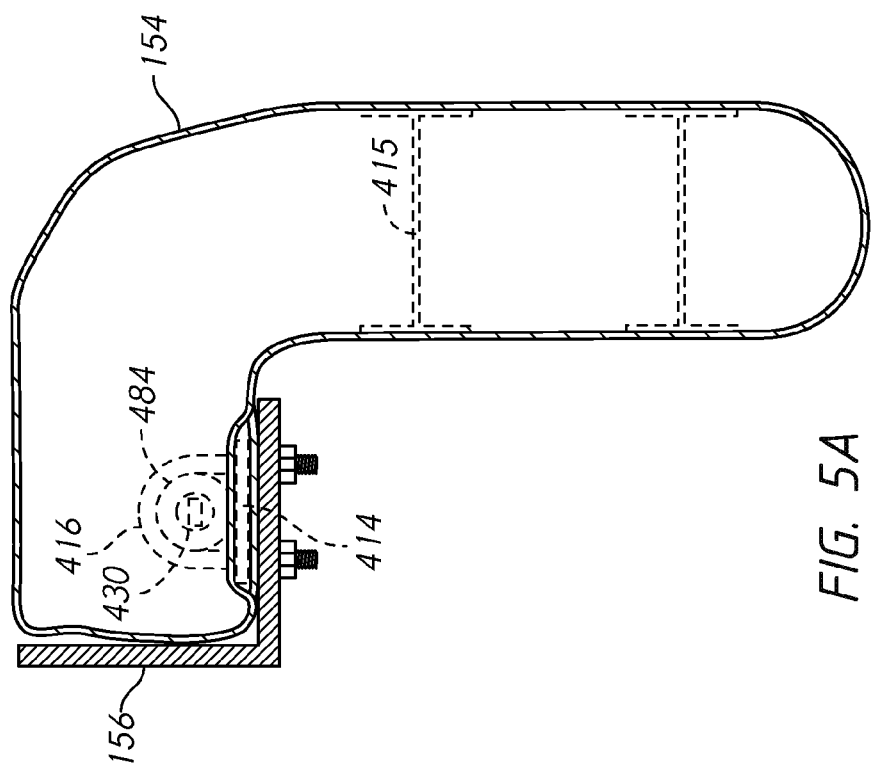

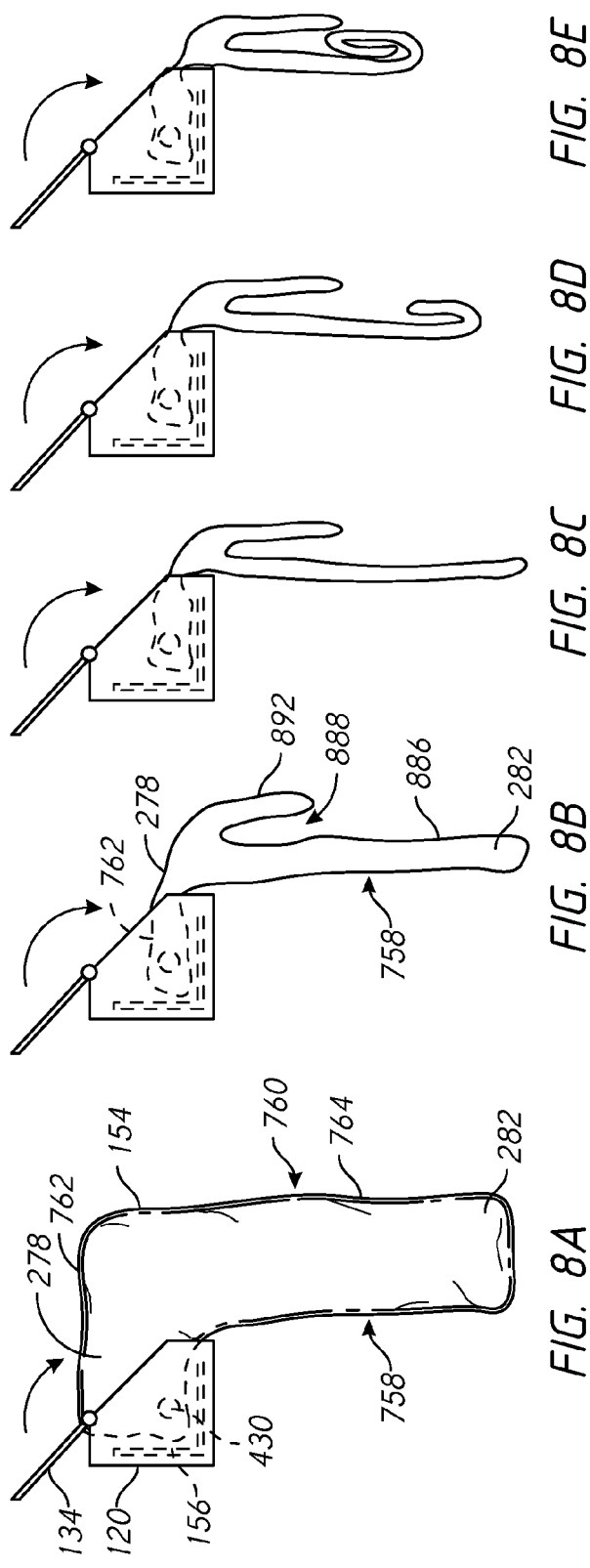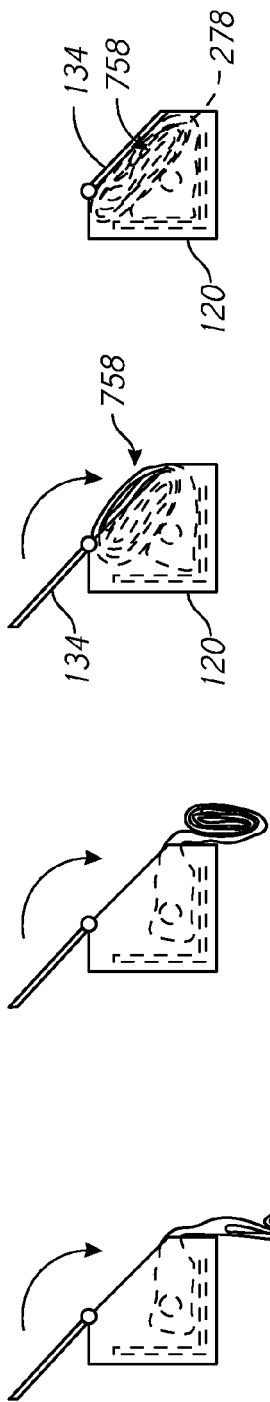

ACTIVE POSITIONING AIRBAG ASSEMBLY AND ASSOCIATED SYSTEMS AND METHODS

TECHNICAL FIELD

The present technology relates generally to airbag safety systems, and more specifically, to airbag assemblies for aircraft and associated systems and methods.

BACKGROUND

Various types of seat belt and airbag systems have been used to protect passengers in automobiles, aircraft and other vehicles. In automobiles, for example, airbags typically deploy from the steering column, dashboard, side panel, and/or other fixed locations. During a rapid deceleration event (e.g., a collision), a sensor detects the event and transmits a corresponding signal to an initiation device (e.g., a pyrotechnic device) on an airbag inflator. This causes the inflator to release compressed gas into the airbag, thereby rapidly inflating the airbag.

Seats in commercial aircraft can be configured in a variety of layouts that provide different spacing between succeeding rows. As a result, airbags have been developed that deploy from seat belts to accommodate occupants in aircraft and other vehicles. In commercial and other aircraft, when an airbag deploys in front of an occupant in a partially upright or fully upright seated position during a crash or deceleration event, the airbag must position itself in front of a strike hazard before the occupant hits the strike hazard. However, occupants utilizing a two-point restraint, for example, may be seated in the brace position for precautionary reasons during or prior to a crash event. Accordingly, airbag systems are needed to provide protection for occupants in generally upright seating positions, while not injuring or impacting an occupant in the brace position during deployment. Generally, an automotive steering wheel or passenger seat airbag that deploys directly in front of an occupant is not feasible for use with an occupant in the brace position because it may directly impact the occupant's head during deployment.

BRIEF DESCRIPTION OF THE DRAWINGS

FIGS. 2A-2E are a series of side views illustrating various stages of deployment of an airbag assembly relative to an occupant seated in an upright position in accordance with an embodiment of the present technology.

FIG. 5A is a side view of the airbag assembly of FIG. 4A, and FIG. 5B is an enlarged side view of a portion of the airbag assembly of FIG. 4A.

FIGS. 8A-8I are a series of side views illustrating various stages of folding an airbag for storage in accordance with an embodiment of the present technology.

DETAILED DESCRIPTION

Figure 1:
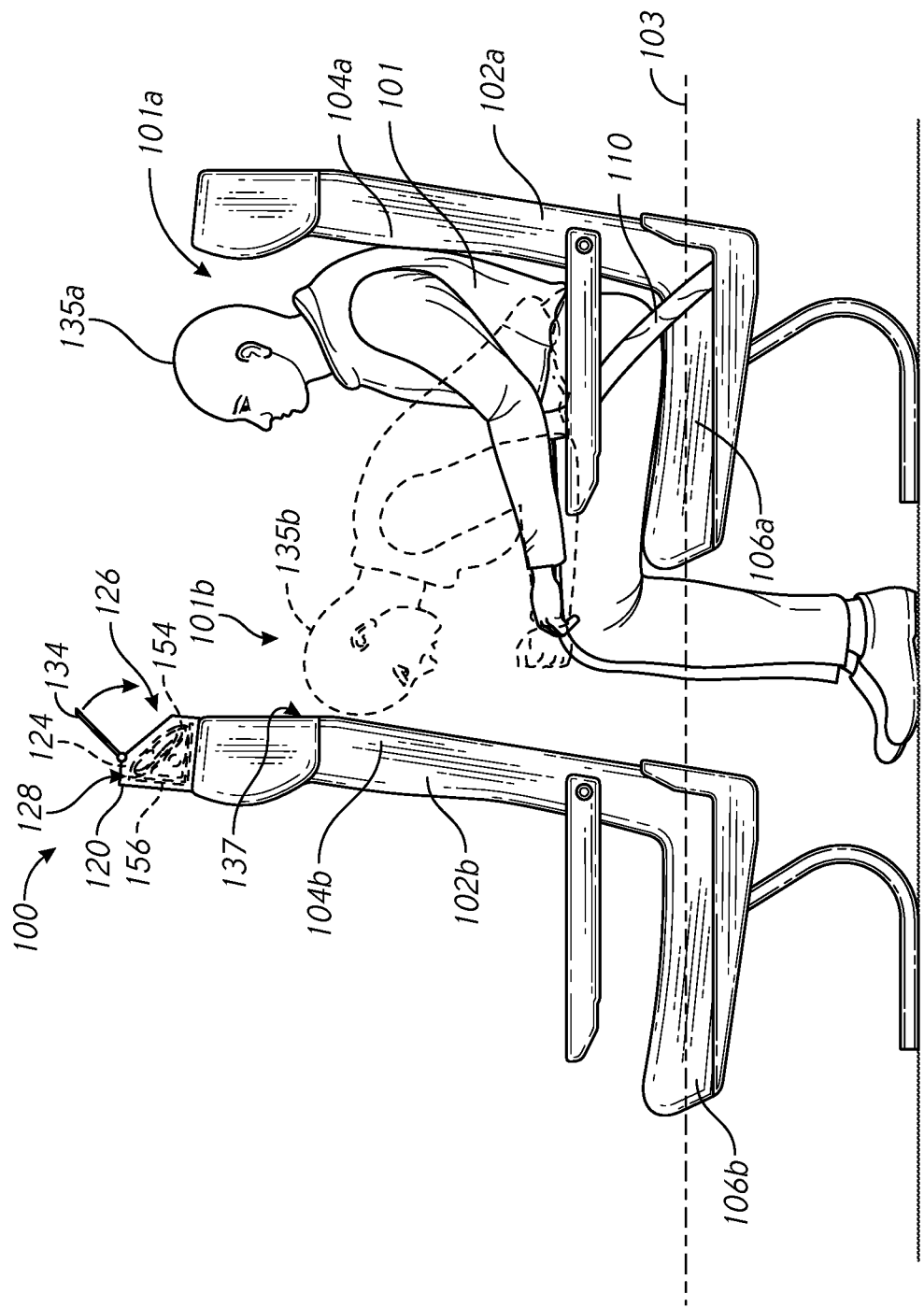
FIG. 1 is a partial side view of a seating area in an aircraft having a forward-facing seat provided with an airbag system configured in accordance with an embodiment of the present technology.

The present technology describes various embodiments of active positioning airbag assemblies for use in aircraft and other vehicles, and associated systems and methods that can provide protection for occupants in seated (e.g., upright seated) positions as well as occupants in "out-of-position" (e.g., brace) orientations. In several embodiments of the present technology, an airbag system (e.g., a structure mounted airbag system) in a commercial or other aircraft can include a housing carried on a seatback or other structure (e.g., a ceiling, wall, divider, or other monument) positioned directly forward of, or indirectly forward of (e.g., offset to a side or at an angle) a seated occupant or passenger. The housing can contain an airbag mounted behind a covered or uncovered opening. During a crash or rapid deceleration event, the airbag can deploy through the opening in a manner that can avoid striking an occupant in an "out-of-position" seating orientation in a way that may cause injury. For example, in some embodiments the airbag deploys up and away from the occupant and then comes to rest on or behind the occupant's head. However, the airbag is also designed to deploy up and away from the occupant and then move into position in front of the occupant quickly enough to protect the occupant from a strike hazard when the occupant is seated in an upright position.

As used herein, the term "forward of" in relation to a position in an aircraft refers to a location in front of the position relative to a longitudinal axis extending between the front and rear of the aircraft. Therefore, in an aircraft "forward of" a particular location is defined as being positioned closer to the front, nose and/or cockpit of the aircraft than the location.

In some embodiments, an airbag as disclosed herein can be automatically deployed using a crash sensor, thus not requiring passenger or flight attendant actuation, deactivation, monitoring, and/or supervision prior to take-off. In some embodiments, the airbag is designed to automatically deflate within seconds of deployment to not impede passenger egress (e.g., egress out of a seat row into the aisle, or through the seat row to the exit) off the aircraft after the crash event. Deployment of the airbag will not injure occupants seated in an "out-of-position" orientation (e.g., a brace position), and can provide protection for occupants in a normal or nominal (e.g., an upright) seated position. For example, the airbag can initially deploy upward and rearward, and then position itself (e.g., actively position itself) between a seated occupant and strike hazard in as little as 20-40 milliseconds. In certain embodiments, the airbag can absorb the impact from an occupant's head and mitigate potential injury without the supplemental help of a shoulder harness (e.g., the airbag can be used with a two-point restraint or seat belt). Use of the airbag with standard two-point seat belts can also improve cosmetics and comfort and/or require less frequent maintenance than existing airbag systems.

Airbag systems configured in accordance with embodiments of the present technology can be concealed in a housing, behind a module cover, within a seat, or a surrounding or adjacent structure (e.g., a monument) to improve cosmetics and aesthetics of the aircraft cabin and/or to conceal the airbag system such that it is not readily visible to occupants. Additionally, the airbag can be sized to protect the full size range of occupants that may need strike hazard protection in an aircraft. Further, the airbag and/or associated inflator can be sized (e.g., of such a small size) to enhance or improve ease of installing the airbag system and/or to reduce weight. The airbag can have different configurations or shapes depending on the space or room between seats or rows of seats to improve impact protection. As used herein, the terms "structure mounted" and "structure mountable" can refer to airbag assemblies that are or can be mounted to, e.g., a wall, divider, seatback, or a fixed piece of furniture or other interior aircraft structure or monument, rather than to, e.g., a seat belt.

Certain details are set forth in the following description and in FIGS. 1-10G to provide a thorough understanding of various embodiments of the present technology. For example, several embodiments of structure mounted airbag systems are described below in the context of commercial or other aircraft with forward-facing seats. However, the airbag systems and aspects thereof disclosed herein may be used in a wide variety of other vehicles, including other aircraft (e.g., private, commercial and military aircraft), ground vehicles (e.g., automobiles, trucks, buses, trains, and motor homes), watercraft, etc. Other details describing well-known structures and systems often associated with airbags, circuitry (e.g., for deploying the airbag or sensing a crash event), restraint systems, etc., have not been set forth below to avoid unnecessarily obscuring the description of the various embodiments of the present technology.

Many of the details, dimensions, angles and other features shown in FIGS. 1-10G are merely illustrative of particular embodiments of the present technology. Accordingly, other embodiments can include other details, dimensions, angles and features without departing from the spirit or scope of the present invention. In addition, those of ordinary skill in the art will appreciate that further embodiments of the structure mounted airbag systems can be practiced without several of the details described below.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

FIG. 1 is a side view of a seating area in an aircraft having one or more forward-facing seats 102 (identified individually as seats 102a and 102b) or rows of seats provided with an airbag system 100 configured in accordance with an embodiment of the present technology. In the illustrated embodiment, the forward-facing seats 102a, 102b are aligned (e.g., are parallel) with a longitudinal axis 103 of the aircraft extending between the front and rear of the aircraft, such that seated occupants face toward the front of the aircraft and the direction of flight. In one aspect of the illustrated embodiment, the seats 102a, 102b can be at least generally similar to conventional forward-facing seats in, for example, a commercial aircraft or jet. Accordingly, each seat 102a, 102b can include a back portion 104 (identified individually as back portions 104a and 104b) extending upwardly from a seat portion 106 (identified individually as seat portions 106a and 106b) fixedly mounted to the floor of the aircraft. Each of the seats 102a, 102b can also include an occupant restraint or seat belt 110 (e.g., a two-point seat belt) configured to restrain the occupant in a conventional manner.

In certain embodiments, the use of a two-point seat belt 110 (e.g., a lap belt) allows a seated occupant 101 to move from an upright position (as identified by reference number 101a) to a brace position (as shown by the broken lines in FIG. 1 and identified by reference number 101b). For example, in the upright position 101a, the occupant 101 can be seated against the back portion 104a (e.g., with the occupant's back and head 135a extending at about 90 degrees relative to his legs). In the brace position 101b, the occupant 101 can be spaced apart from the back portion 104a (e.g., with the occupant's back and head 135b angled forward relative to the back portion 104a and his legs). Unlike a three-point restraint with a shoulder harness, the two-point seat belt 110 generally does not prevent or slow acceleration of the occupant's head 135 toward a potential strike hazard 137 (e.g., a seat, wall, divider, or other monument) positioned forward of the seated occupant 101. Further, as illustrated in FIG. 1, in the brace position 101b, the occupant's head 135b may be positioned directly in back of, adjacent to, or even against the strike hazard 137.

As described in greater detail below, the airbag system 100 includes an airbag assembly 128 having an airbag 154 that can be stored (e.g., folded, rolled and/or stowed) in a housing 120 and deployed through an opening 126 in the housing 120. In FIG. 1, the airbag 154 is mounted to an L-shaped mounting bracket 156 and stored within a cavity 124 of the housing 120 (as illustrated by broken lines in FIG. 1). The mounting bracket 156 can be fixedly attached or secured to the housing 120 and/or an upper portion of the seatback 104b or other mounting structure (e.g., a wall, ceiling, divider, or other monument) positioned forward of the occupant 101.

As described in greater detail below, during deployment, the airbag 154 can deploy in multiple directions. For example, the airbag 154 can initially deploy away from the occupant's head 135a or 135b, and then the airbag 154 can move downward as it inflates to its final position in back of the strike hazard 137 such that the airbag 154 is between the occupant's head 135a and the strike hazard 137 (when the occupant 101 is seated in the upright position 101A) and/or on the back of the occupant's head 135b, back and/or neck (when the occupant 101 is seated in the brace position 101B). The airbag 154 can lessen the crash impact experienced by the seat occupant 101 (e.g., against the strike hazard 137) if the occupant 101 was seated in the upright position 101A. The airbag 154 can settle harmlessly on the back of the occupant's head 135b if the occupant 101 was seated in the brace position 101B.

In one aspect of the illustrated embodiment, the housing 120 is a separate or independent structural assembly that can be fixedly attached to or positioned on and/or within the seatback 104b or other mounting structure (e.g., a wall, ceiling, divider, or other monument) positioned forward of the seated occupant 101 and the seat 102a. For example, as illustrated in FIG. 1, the housing 120 can be positioned on the upper back portion 104b of the seat 102b. The housing 120 and/or back portion 104b can hide or conceal the airbag 154 from view of the occupant 101 and provide an aesthetically pleasing seating environment. Concealing the airbag 154 in this manner can also prevent passengers from accessing the airbag assembly 128 and/or associated components within the housing 120 and causing inadvertent airbag deployment and/or unnecessary wear and tear.

In the illustrated embodiments, the housing 120 can include a cover or door 134 over the opening 126. Example covers or doors are disclosed in U.S. Pat. No. 8,523,220, entitled "STRUCTURE MOUNTED AIRBAG ASSEMBLIES AND ASSOCIATED SYSTEMS AND METHODS," which is incorporated herein in its entirety by reference. The cover or door 134 can be positioned across the opening 126 and at least substantially conceal the cavity 124 formed within the housing 120 from view before airbag deployment. The door 134 can be attached to the housing 120 using one or more releasable fasteners and/or hinges that enable the door 134 to swing or otherwise move away from the opening 126 under the force of the inflating airbag, thereby allowing the airbag to deploy through the opening 126. The door 134, for example, can be secured over the opening 126 with a plurality of screws that are configured to break under the force of airbag deployment. In other embodiments, the door 134 can be configured to automatically move (e.g., rotate about a hinge) away from the opening 126 in response to a crash event rather than relying on the force of the airbag. The door 134, for example, can include electronics (e.g., a sensor, an actuator, a controller, a power source) to automatically slide, pivot, and/or otherwise move away from the opening 126 in response to or in anticipation of airbag deployment. In lieu of a door, a leather or other flexible material cover with a tear seam can be used to conceal the airbag and tear open during airbag deployment. The housing 120 can be made from durable materials, such as composites, alloys (e.g., aluminum alloys), and/or other suitable materials (e.g., sheet metal, steel, etc.). In other embodiments, the housing 120 can be attached to or integrally formed with a portion of the aircraft (e.g., a seat, divider, wall, ceiling, or other interior structure or monument).

Figure 2B:
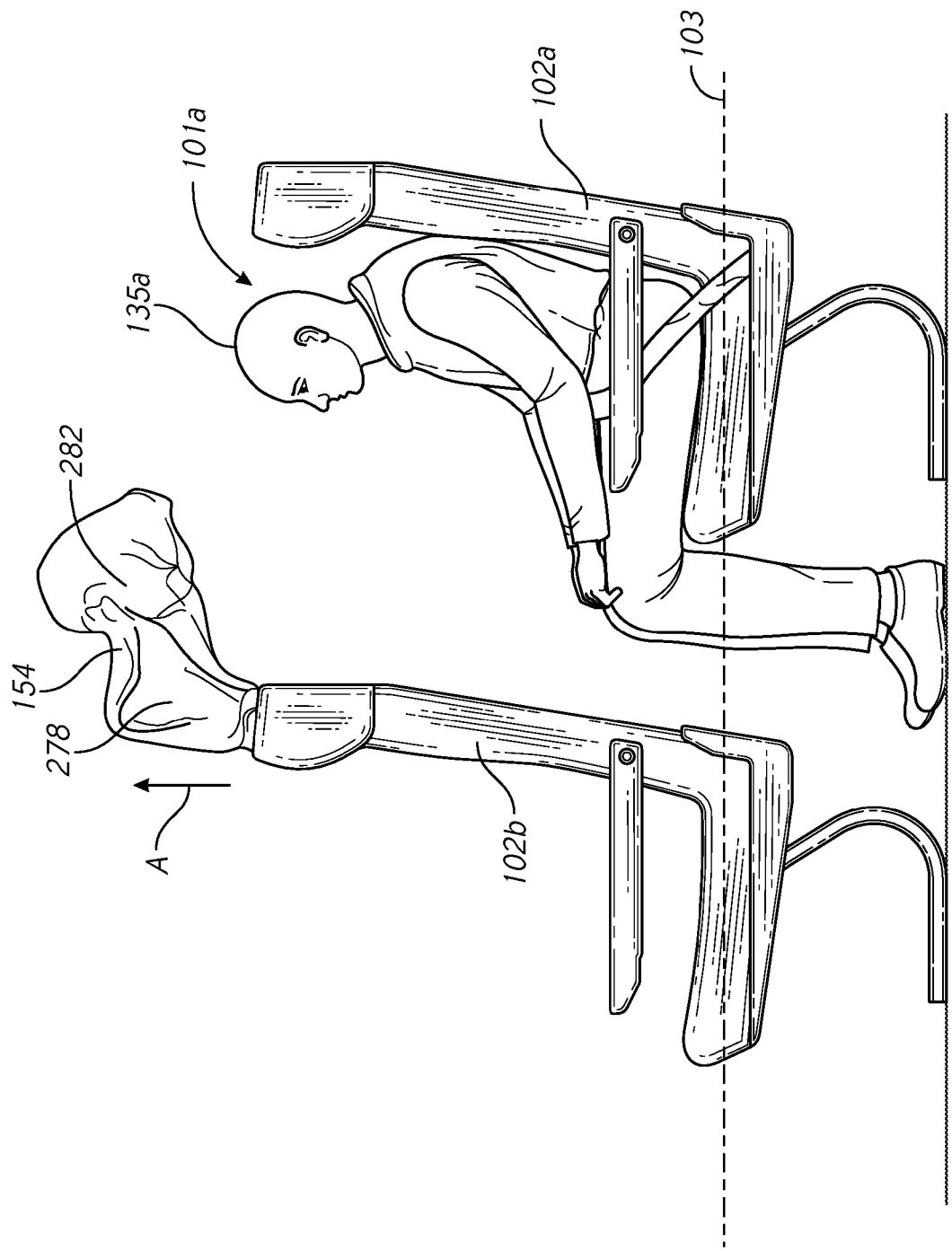

FIGS. 2A-2E are a series of side views illustrating various stages of deployment of the airbag system 100 configured in accordance with an embodiment of the present technology. FIG. 2A illustrates the occupant 101 seated in the upright or partially upright position 101a. In FIGS. 2B-2E, the housing 120 and mounting bracket 156 have been removed for clarity to show other features. Referring to FIG. 2B, upon detection of a crash event (e.g., by a crash sensor operably coupled to the airbag assembly 128), the airbag 254 inflates and unfolds (e.g., moves, unfurls, and/or unrolls) through the opening 126 in the housing 120 initially in a generally upward direction as indicated by arrow A. Accordingly, the airbag 254 initially deploys up and away from the occupant's head 135a if the occupant 101 is seated in the upright position 101a.

Figure 2C:
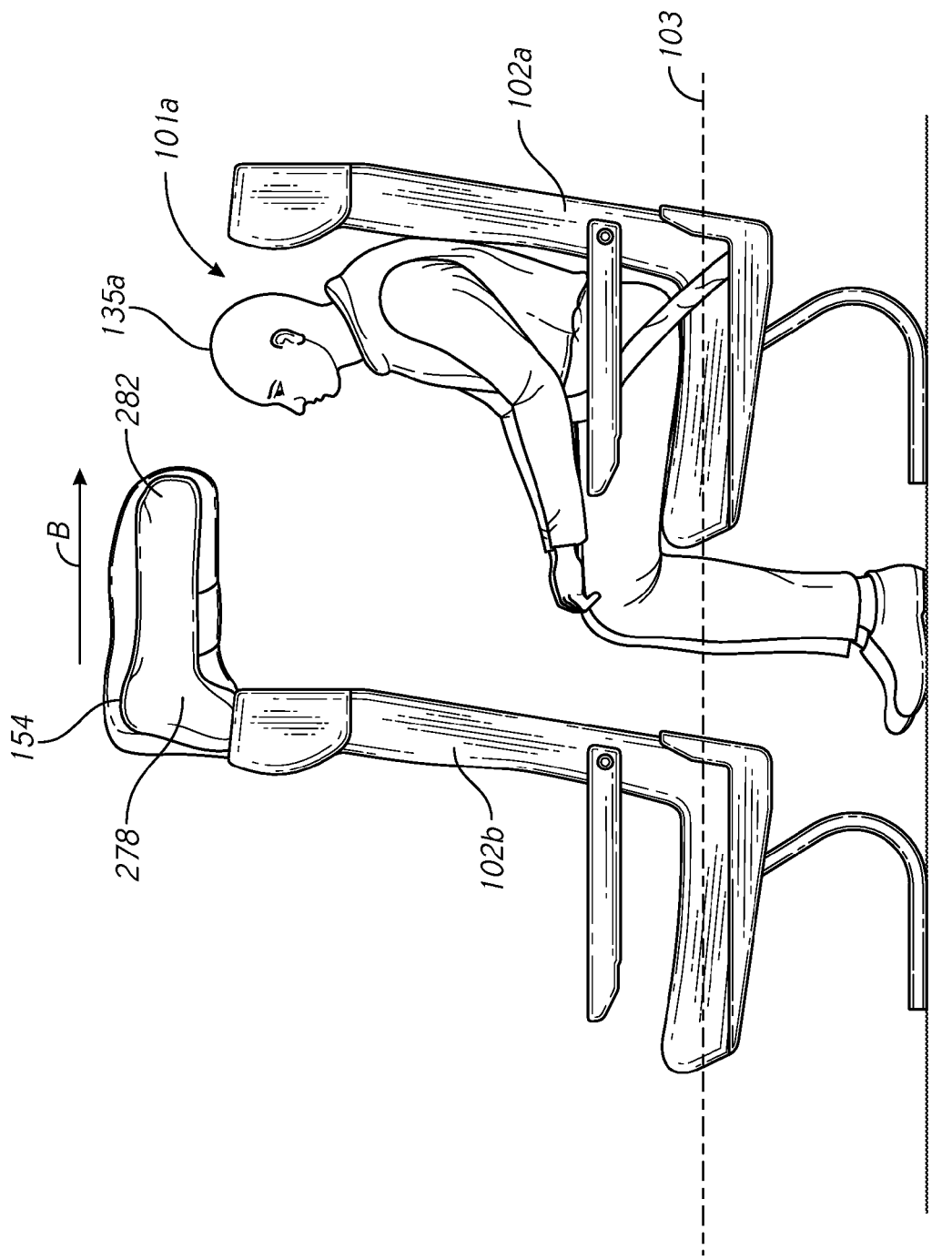

When inflated, gas can at least partially, initially fill an upper portion 278 of the airbag 154 prior to a lower portion 282 which pushes the airbag 154 in an upward direction away from the housing 120 and seat 102b. As illustrated in FIG. 2B, after the upper portion 278 is initially deployed/inflated (e.g., in an upward direction A), the lower portion 282 unfolds (e.g., moves, unfurls, and/or unrolls) upwardly. Referring next to FIG. 2C, as the airbag 154 continues to inflate, it unfolds or unfurls in the longitudinal or horizontal direction generally towards seat 102A and occupant 101 (e.g., as indicated by arrow B) positioned rearward of seat 102b.

Figure 2D:
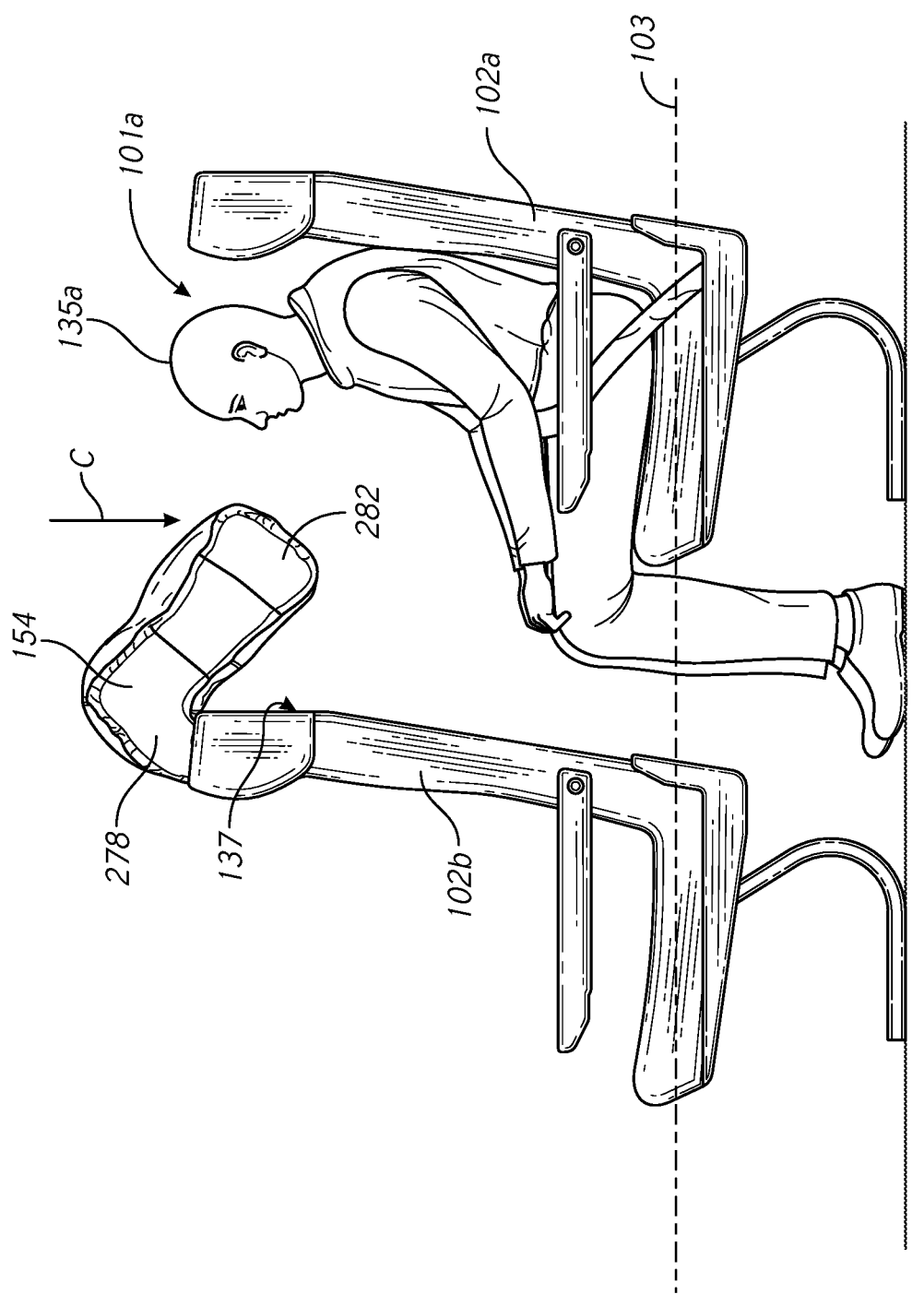
Figure 2E:
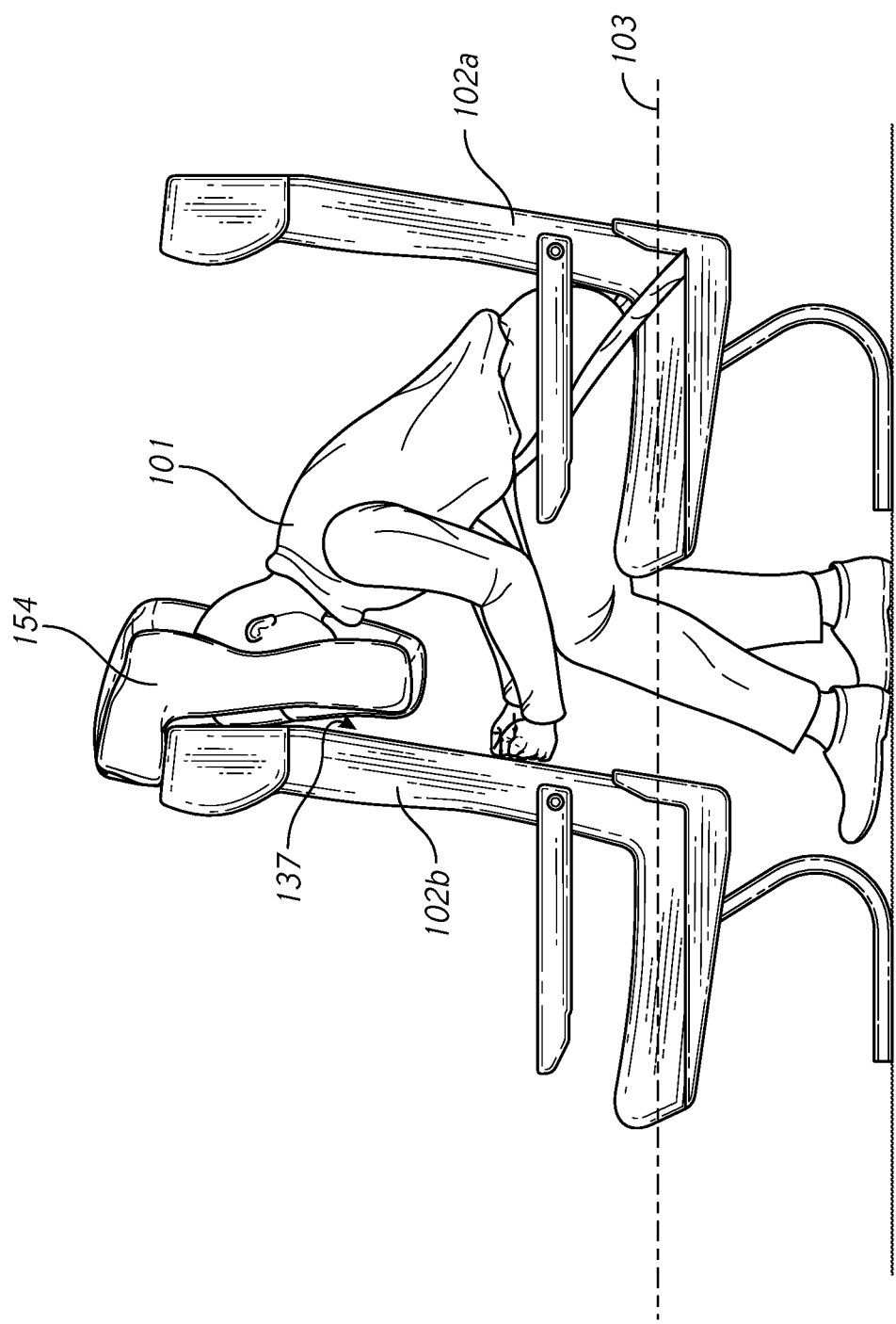

After the airbag 154 has unfolded out of the housing 120, it rapidly begins to pressurize and inflate to reach a fully inflated configuration (e.g., an inverted L-shaped configuration). Referring to FIG. 2D, as the airbag 154 reaches its fully inflated configuration, the airbag 154 actively positions itself in a downward position (e.g., as indicated by arrow C) between the strike hazard 137 (e.g., the back of seat 102b, wall, divider, or other monument) and the occupant 101. If the occupant 101 is seated in the upright position 101A, the airbag 154 moves itself between the strike hazard 137 and the occupant's head 135A, as illustrated in FIG. 2E, to mitigate or reduce any potential injury to the occupant 101 from striking the hazard 137. The airbag 154's initial main deployment force is in a direction (e.g., upward) away from the occupant 101. Only after the main deployment of the airbag 154 has occurred and as the airbag 154 reaches operating pressure, does the airbag 154 move into position in back of the strike hazard 137.

As illustrated in FIG. 2E, the airbag 154 deploys upwards, and positions itself in back of the strike hazard 137 during a crash or deceleration event before the upright occupant 101 moves forward enough to block the airbag 154 from reaching its final intended position or strike the hazard 137. In certain embodiments, the airbag 154 can reach its final position (e.g., in back of the strike hazard 137) in less than or equal to about 60 milliseconds, or less than or equal to about 50 milliseconds, or less than or equal to about 40 milliseconds, or less than or equal to about 30 milliseconds, or less than or equal to about 20 milliseconds, or less than or equal to about 10 milliseconds, and/or any value therebetween.

In the illustrated embodiments, the airbag 154 includes a generally inverted L-shaped cross-sectional configuration. In other embodiments, the airbag 154 can have other suitable configurations to accommodate various configurations of the location of the airbag system 100, shapes of the reaction surfaces and/or spacing between seats. The airbag 154 is sized and shaped to accommodate a wide range of occupant sizes and positions. The airbag 154 can include one or more vents as described below in connection with FIG. 4 for releasing gas from within the airbag 154 after deployment. The airbag 154 can meet all aviation regulatory requirement including for lap-held children, children in child-restraint devices, brace positions, and/or out-of-position occupants.

FIG. 2E illustrates the airbag system 100 after the seat occupant 101 impacts the airbag 154. The load experienced by the occupant's head 135a is distributed across the expanded airbag 154 to mitigate injury. In various embodiments, the impact of the seat occupant 101 against the airbag 154 can activate the vent to rapidly decrease the pressure within the airbag 154 and further reduce the impact experienced by the seat occupant 101. The vent can also serve to quickly deflate the airbag 154 to provide a substantially clear passageway for the seat occupant 101 exit the aircraft.

Figure 3A:
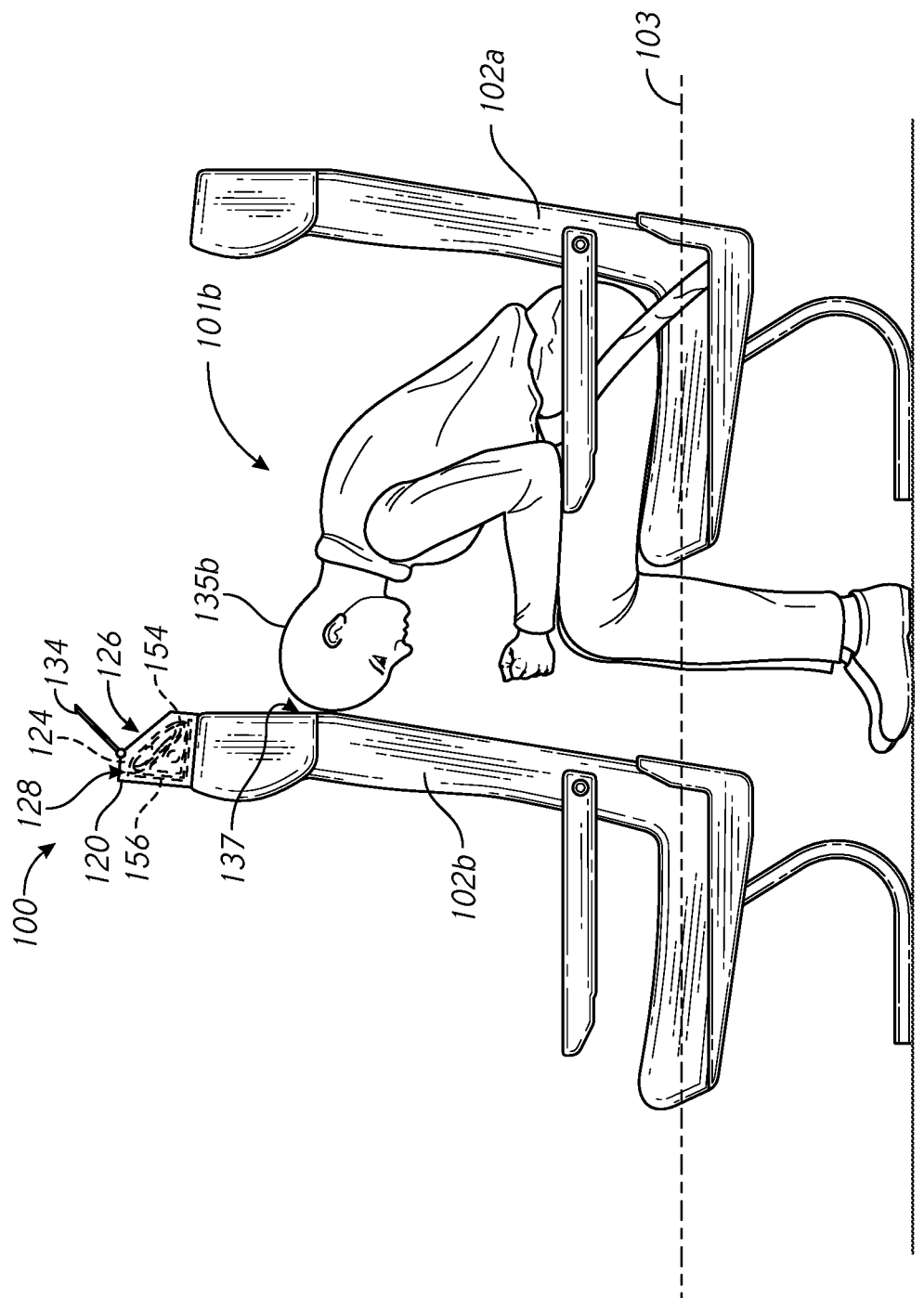
FIGS. 3A-3D are a series of side views illustrating various stages of deployment of an airbag assembly relative to an occupant seated in a brace position in accordance with an embodiment of the present technology.
Figure 3B:
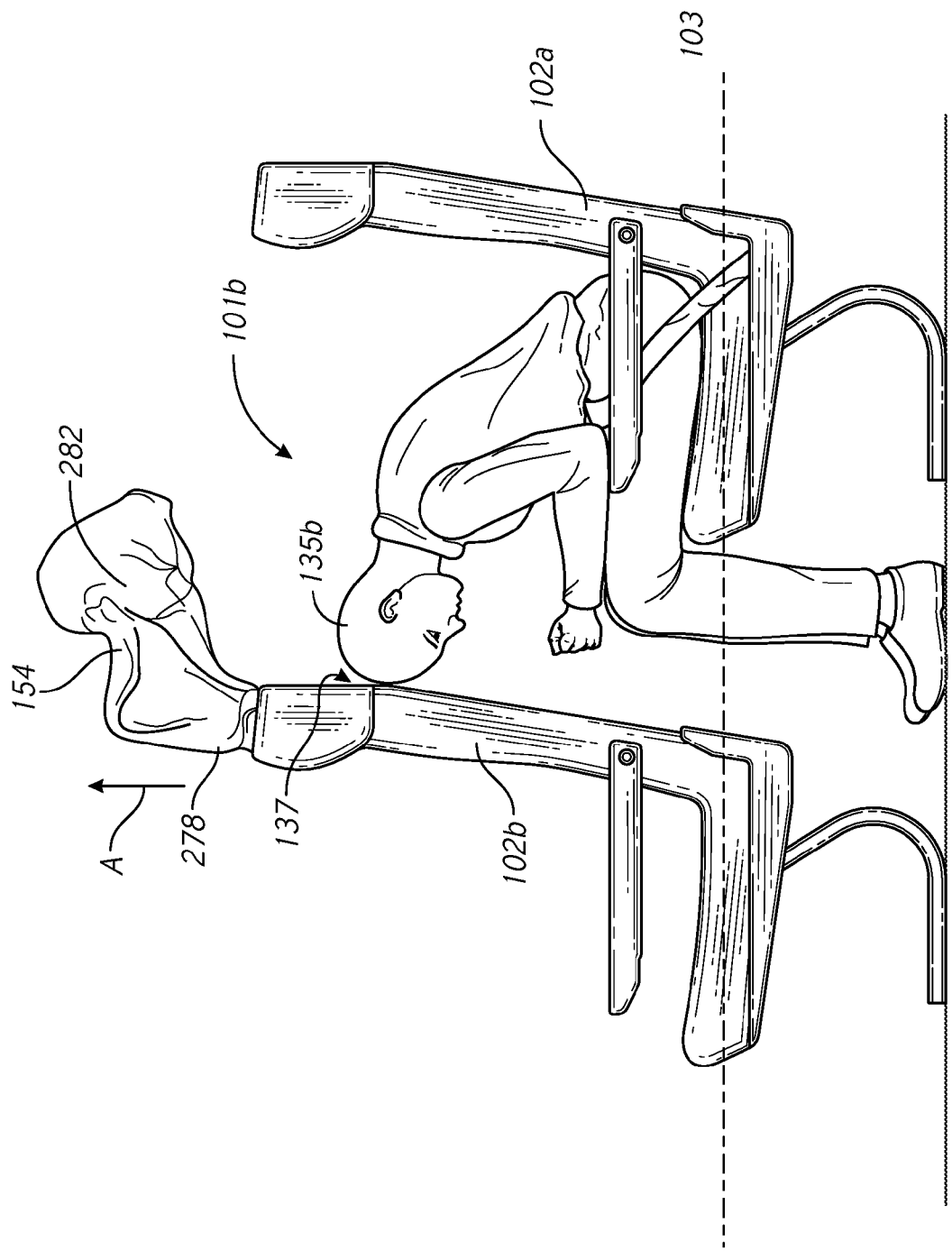
Figure 3C:
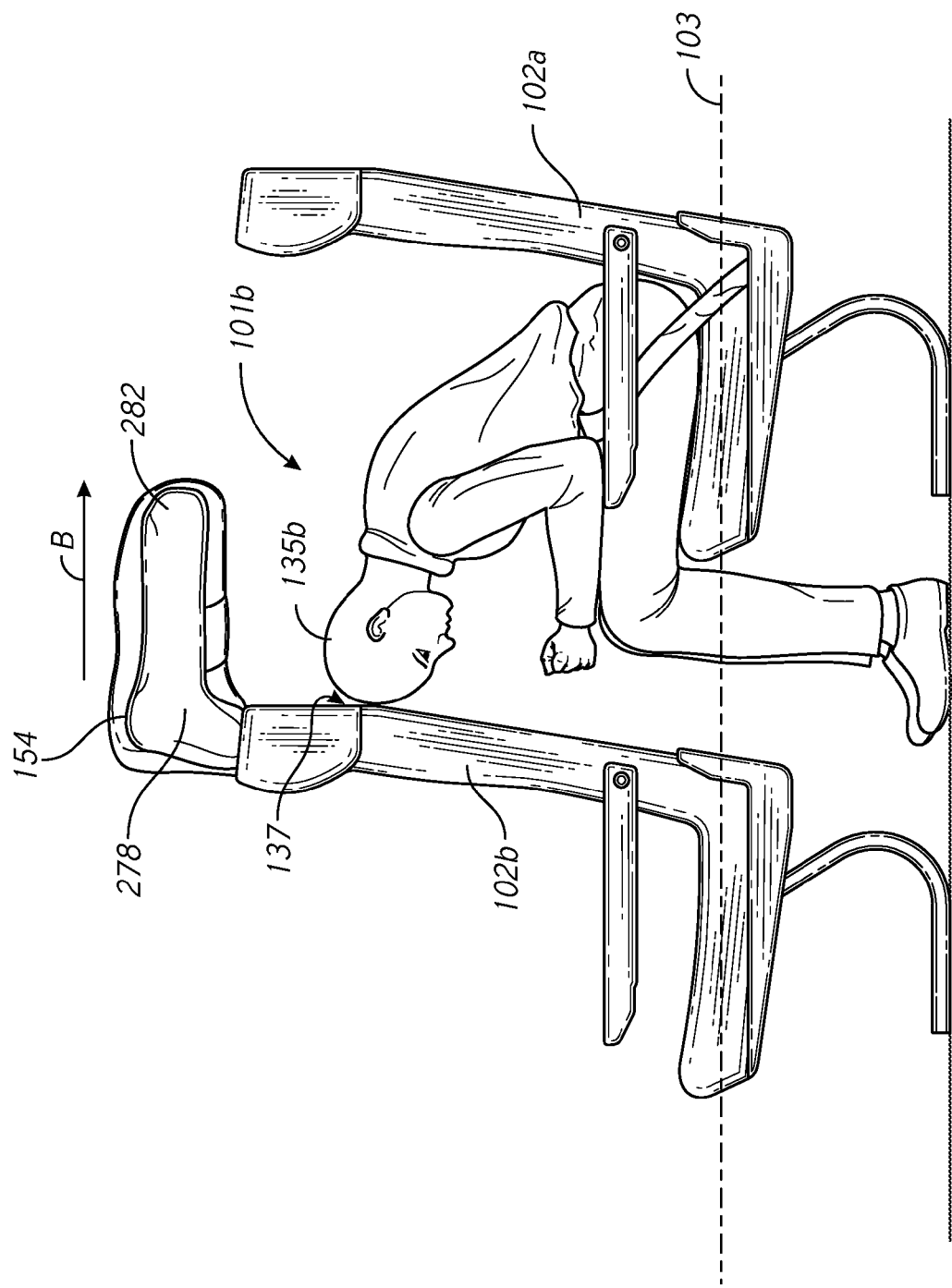
Figure 3D:
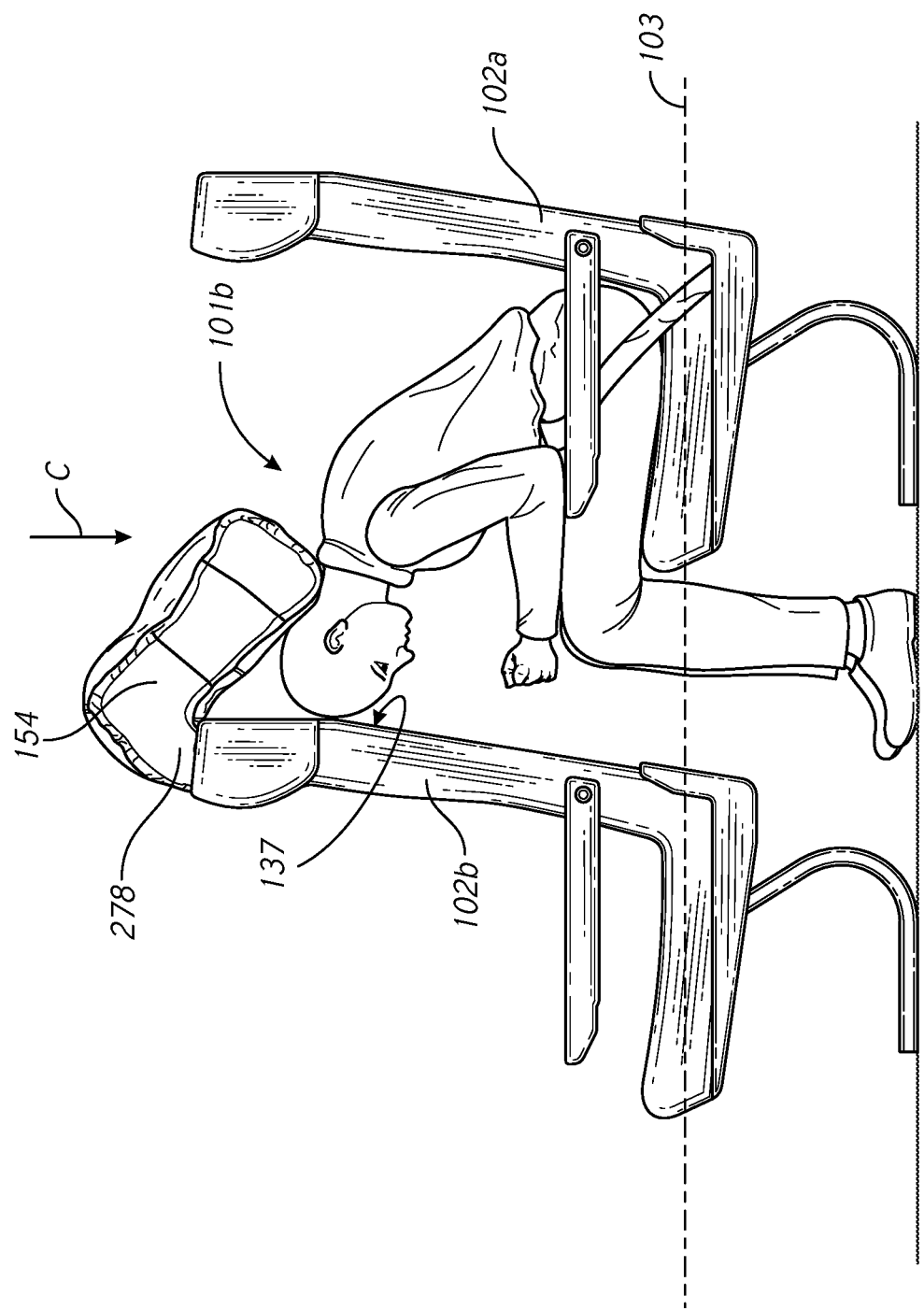

FIGS. 3A-3D are a series of side views illustrating various stages of deployment of the airbag system 100 configured in accordance with an embodiment of the present technology. In FIGS. 3B-3D, the housing 120 and mounting bracket 156 have been removed for clarity to show other features. FIGS. 3A-3D illustrate the occupant 101 seated in the brace position 101b rather than the upright position 101a as illustrated in FIGS. 2A-2E. Referring to FIG. 3B, upon detection of a crash event (e.g., by a crash sensor operably coupled to the airbag assembly 128), the airbag 154 initially inflates and unfolds or otherwise moves through the opening 126 in the housing 120 in a generally upward direction as indicated by arrow A. As a result, the airbag 154 initially deploys up and away from the occupant's head 135b if the occupant 101 is seated in the brace position 101b.

When inflated, gas can at least partially, initially fill the upper portion 278 of the airbag 154 prior to the lower portion 282 which pushes the airbag 154 in an upward direction away from the housing 120 and seat 102b. As illustrated in FIG. 2B, after the upper portion 278 is deploys, the lower portion 282 initially unfolds (e.g., moves, unfurls, and/or unrolls) generally upwardly. Referring next to FIG. 3C, the airbag 354 then deploys in the longitudinal or horizontal rearward direction generally towards the seat 102a and the occupant 101 as indicated by arrow B.

After the airbag 154 has unfolded out of the housing 120, it rapidly begins to pressurize and inflate to reach a fully inflated configuration (e.g., an inverted L-shaped configuration). Referring to FIG. 3D, as the airbag 154 continues to inflate, it actively moves (e.g., unfolds, unfurls, and/or unrolls) in a generally downward direction as indicated by arrow C. When the occupant 101 is in the brace position 101B, however, the occupant 101 prevents the airbag 154 from moving into the same position in back of the strike hazard 137 illustrated in FIG. 2E. Instead, if the occupant 101 is in the brace position 101b, the airbag 154 will settle on or about the back of the occupant's head 135B, back and/or neck when fully inflated. Because the airbag 154 initially deploys upwardly and then in a longitudinal direction prior to moving downwardly, the airbag 154 can be used with occupants seated in brace positions. Such movement or deployment of the airbag 154 prevents the airbag from impacting an occupant seated in the brace position 101b.

Figure 4A:
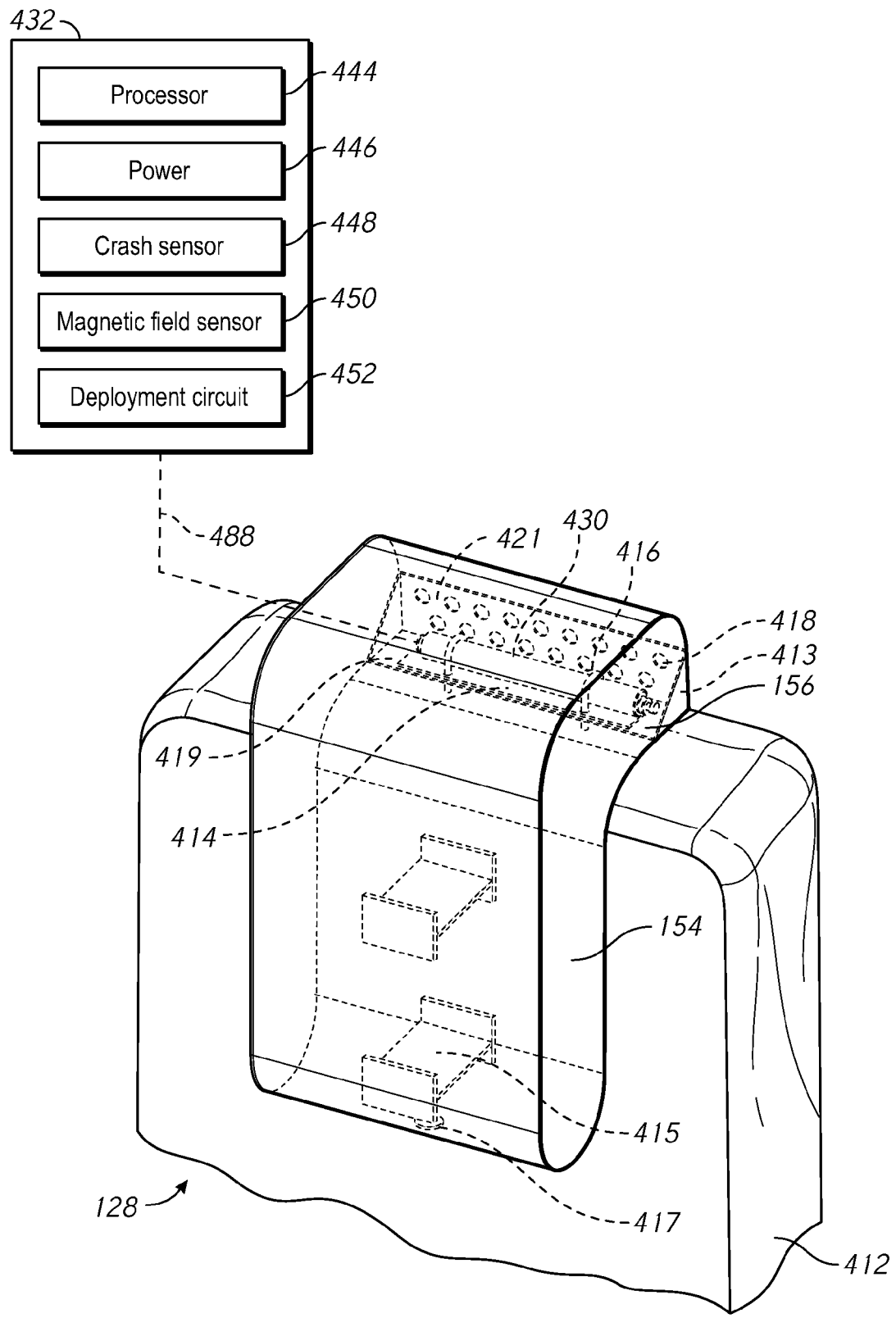
FIG. 4A is a rear isometric view of a deployed airbag assembly.

FIG. 4A is a rear isometric view of the airbag assembly 128 configured in accordance with an embodiment of the present technology. The housing 120 has been omitted from FIG. 4A to illustrate other features more clearly. As discussed above, the airbag assembly 128 includes the airbag 154, which can be secured to an aircraft mounting structure via one or more screws, mounting plates, brackets and/or other suitable attachment features. For example, as illustrated in FIG. 4A, the airbag 154 is secured to the mounting bracket 156. In the illustrated embodiment, the mounting bracket 156 has a generally L-shaped configuration with a vertically extending plate 421 and a bottom or base plate 419 extending in a longitudinal or horizontal direction transverse to the vertically extending plate 421. The mounting bracket 156 includes two opposing triangularly-shaped side walls 413. In other embodiments, the mounting bracket 156 can have other suitable configurations. The mounting bracket 156 can be secured to a housing, seat, and/or other mounting structure 412 using suitable fasteners as described below. In other embodiments, the bracket 156 can be integrally formed with a housing configured to conceal the airbag 154. Generally, the bracket 156 can be positioned as high as possible on a seat or other mounting structure 412 (e.g., above an occupant seated behind the seat or other mounting structure 412).

The vertically extending plate 421 can provide a reaction surface for the airbag 154 during initial deployment. The reaction surface, shape of the airbag, and manner in which it is folded and stowed (as illustrated and described in FIGS. 8A-10G) allow the airbag 154 to initially deploy upward, then in a longitudinal direction, and then in a downward direction as the airbag inflates and pressurizes to assume its fully inflated configuration. The airbag assembly 154 can be rolled (e.g., folded) to be stored within the bracket 156 in a specific configuration as described in FIGS. 8A-10G. In some embodiments, the airbag 154 is positioned within the cavity 124 of the housing 120 in alignment with the opening 126 such that the airbag 154 can initially deploy through the opening 126 in an upward direction as it inflates. The vertically extending plate 421 and/or base plate 419 can include one or more apertures or holes 418 to reduce weight of the mounting bracket 156 and/or allow a cable 488 from an electronic module assembly 432 to pass through for connection to an inflator 430 carried within the airbag 154 as described below and illustrated in FIGS. 6A-6B.

The airbag 154 can include one or more internal tethers 415. The tethers 415 can be made out of airbag material or other suitable material, and can be secured (e.g., sewn or with other suitable fasteners) to opposing interior portions of the airbag 154. The tethers 115 can be used to maintain the shape or configuration of the airbag 154 (e.g., in an inverted L-shaped configuration) as it inflates and pressurizes. The tethers 115 can have an I-shaped or other suitable configuration.

In various embodiments, the airbag 154 can include one or more vents 417 that open when the pressure within the airbag 154 reaches a predetermined threshold. The vent 417, for example, can be a discrete seam (e.g., aperture, hole, channel) on the airbag 154 that is sewn shut and tears open at a designated pressure (e.g., when the occupant contacts the airbag 154 and/or when the airbag 154 is fully inflated). This feature can limit the force with which the seated occupant impacts the airbag 154 and reduces the rebound of the occupant from the airbag 154. The vent 417 can also allow the airbag 154 to deflate rapidly (e.g., within seconds) after inflation so it does not impede occupant egress from the seat in an emergency situation (e.g., after a crash or deceleration event).

The airbag assembly 128 can further include the airbag inflator 430 carried inside the airbag 154, and the electronics module assembly 432 (shown schematically in FIG. 4A) operably coupled to the inflator 430. The electronics module assembly 432 can be positioned in the housing 120 or other remote position as described below. The inflator 430 can include a container of compressed gas (e.g., air, helium and argon mixture) and a pyrotechnic device (e.g., a squib connector) that can be activated by a signal sent by the electronics module assembly 432 in response to a crash event. The signal initiates the squib, which causes the container to release the expanding gas into the airbag. In other embodiments, the inflator 430 can include other suitable initiation and/or inflation devices (e.g., gas-generating inflators) well known in the art.

Figure 4B:
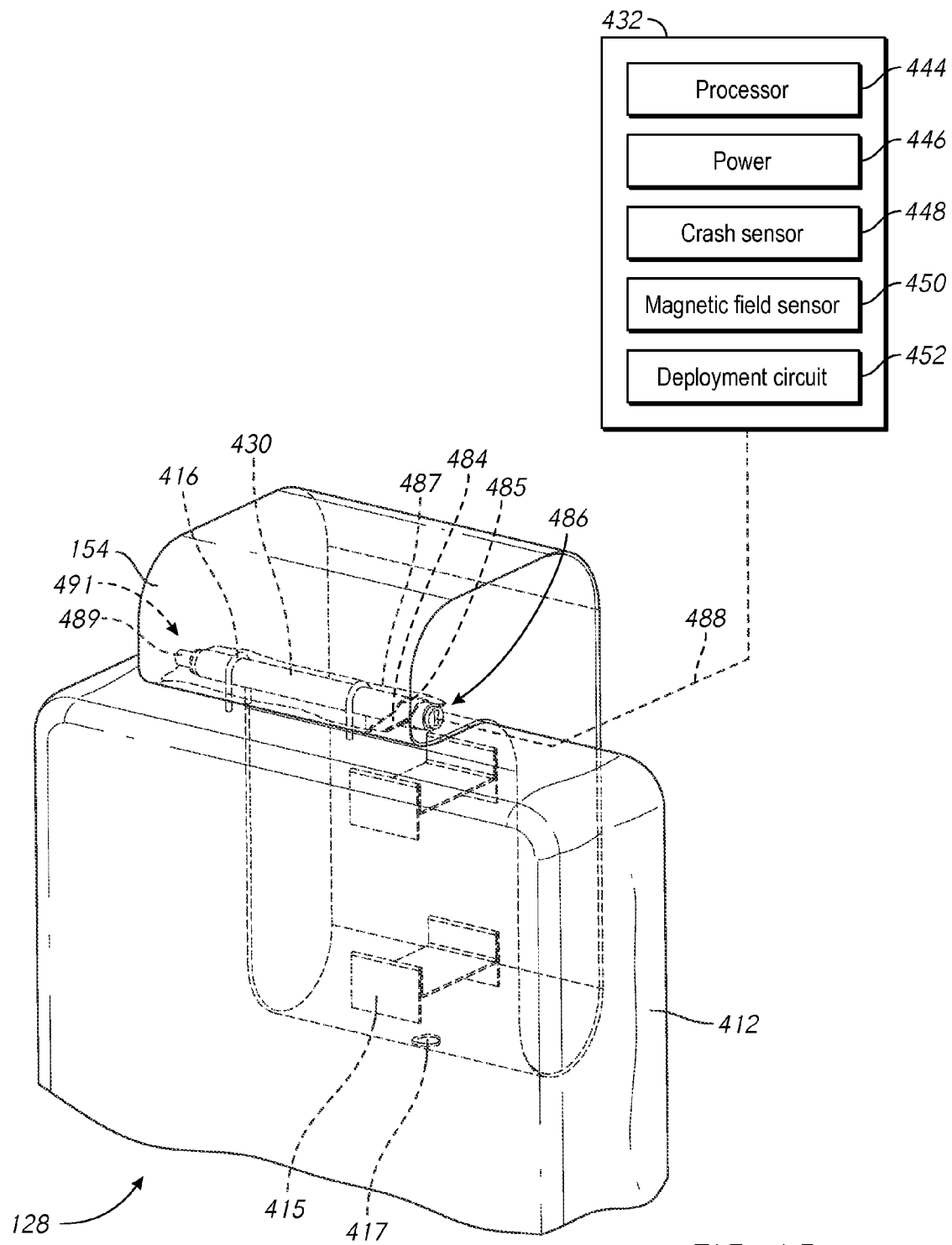
FIG. 4B is a front isometric view of the deployed airbag assembly of FIG. 4A.
Figure 4C:
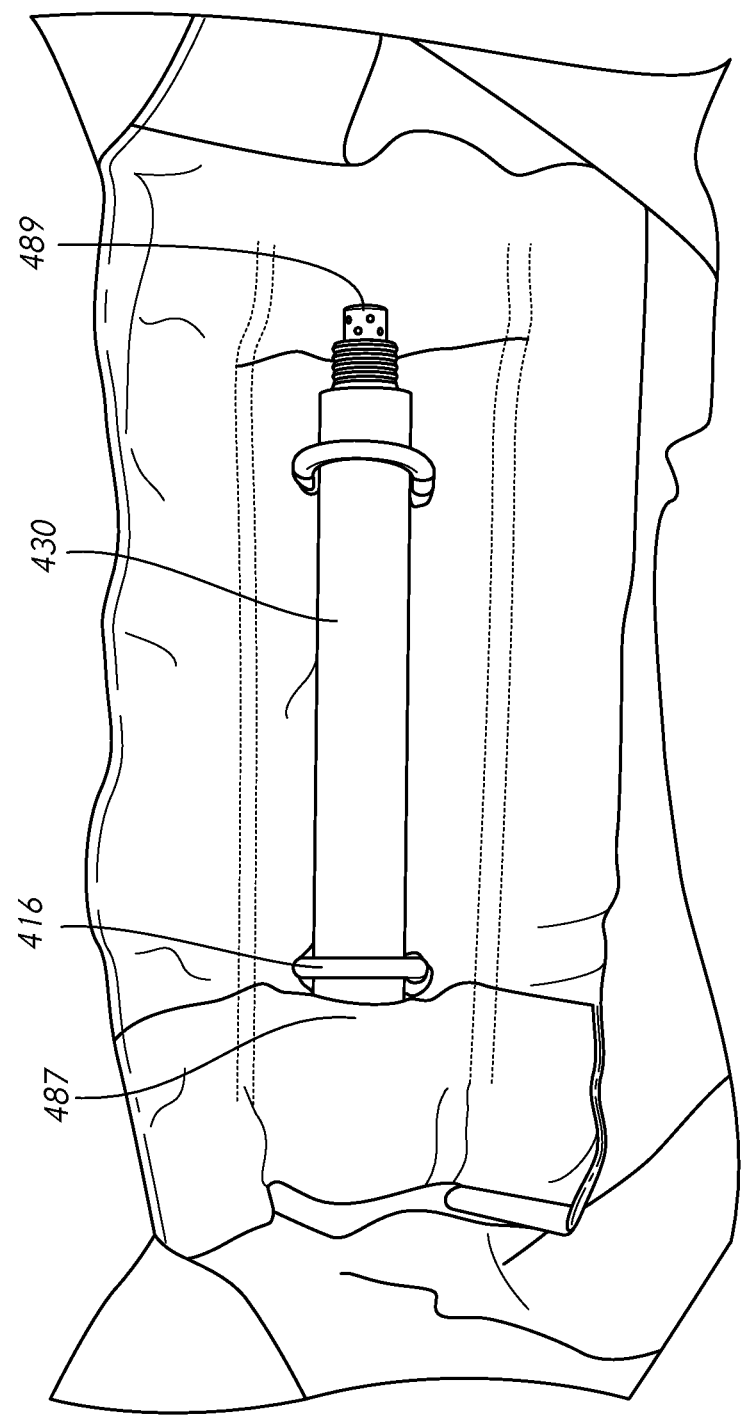
FIG. 4C is a partial interior view of a portion of the airbag assembly of FIG. 4A.
Figure 4D:
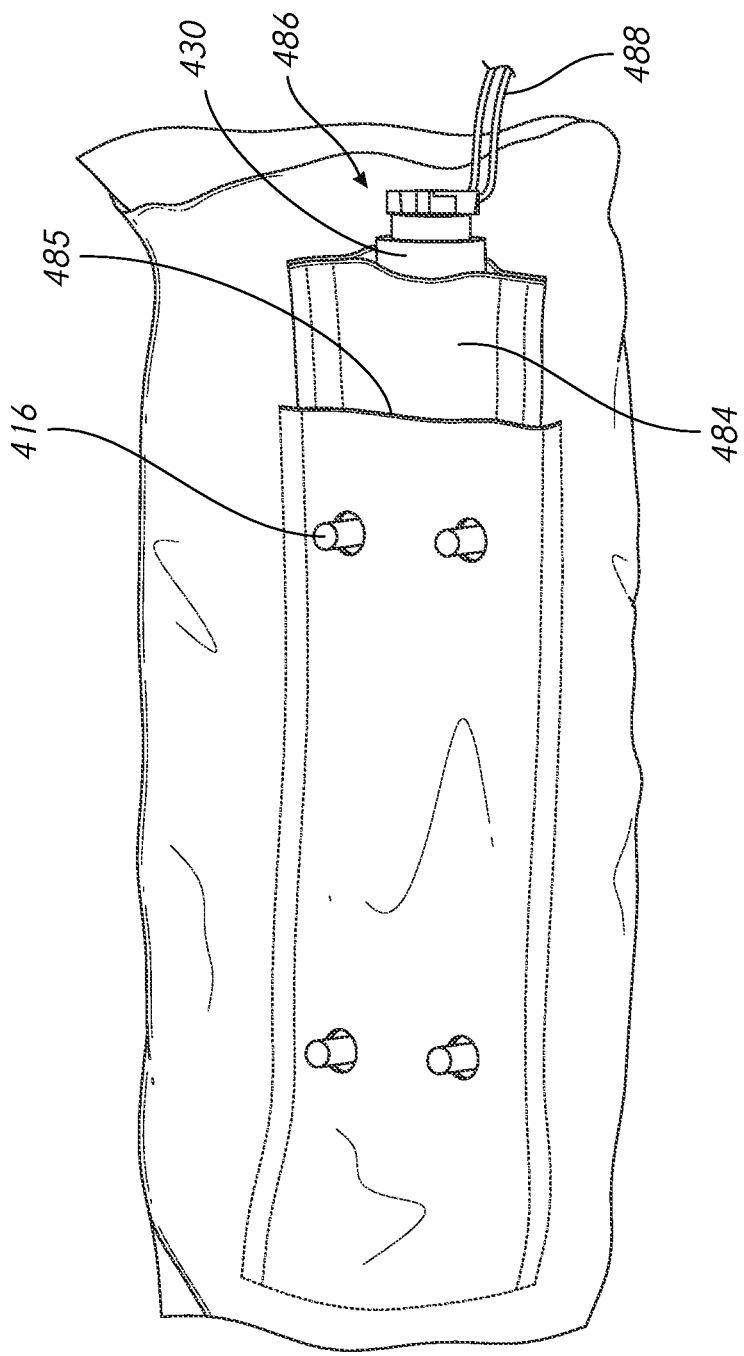
FIG. 4D is a partial bottom view of a portion of the airbag assembly of FIG. 4A configured in accordance with an embodiment of the present technology.

FIG. 4B is a front isometric view of the airbag assembly 128 of FIG. 4A. The bracket 156 and mounting plate 414 have been omitted from FIG. 4B to illustrate other features more clearly. FIG. 4C is a partial interior view and FIG. 4D is a partial bottom view of a portion of the airbag assembly 128 of FIG. 4A. In the illustrated embodiments, a portion of the main body of the inflator 430 is positioned within the airbag 154 through an opening 485 (e.g., a slit, aperture, hole, channel, etc.) formed therein. A first end 486 of the inflator 430 is configured to protrude or extend out of the airbag 154 through the opening 485 for connection to the electronics module assembly 432 via cable 488. A fabric tube 484 can positioned around the first end 486 to help minimize the size of the opening 485 between the inflator 430 and the airbag 154. A first portion of the fabric tube 484 can be sewn to an outer surface of the airbag 154 adjacent the opening 485. A pathway or flap 487 (e.g., a pocket) can be sewn within the airbag 154 adjacent the opening 485 to hold or guide the inflator through the airbag 154 and/or opening 485. The flap 487 and/or fabric tube 484 can be formed of airbag material or other suitable materials configured to be attached or sewn to the airbag 154. A second portion of the fabric tube 484 can extend partially within the airbag 154 through the opening 485. A second opposite end 491 of the inflator 430 can be positioned within the airbag 154 and can include a diffuser 489 as described further below with reference to FIGS. 6A-6B.

FIG. 5A is a side view of the airbag assembly 128 shown in FIG. 4A configured in accordance with an embodiment of the present technology, and FIG. 5B is an enlarged view taken from FIG. 5A. In the illustrated embodiment, the inflator 430 is positioned within the fabric tube 484 made out of airbag or other suitable materials. The fabric tube 484 was omitted from FIG. 4A in order to show other features of the airbag assembly 128 more clearly. The fabric tube 484 and inflator 430 are sized such that minimal air or other gas can be vented through the opening 485 and/or fabric tube 484 during airbag inflation. In certain embodiments, the fabric tube 484 can separate a portion of the inflator 430 from a main interior volume of the airbag 154. The fabric tube 484 can also help secure the inflator 430 in position along with other suitable fasteners.

In some embodiments, an internal mounting plate 414 can be used to secure the airbag 154 to the mounting bracket 156 and/or provide a stabilizing base for the inflator 430. Example internal and external mounting plates are described in U.S. Pat. No. 8,523,220, which is incorporated by reference herein in its entirety. U-shaped bolts 416 or other suitable fasteners (e.g., straps) can be used to secure the inflator 430, airbag 154, fabric tube 584, mounting plate 414, and/or mounting bracket 156 together. In some embodiments, the u-shaped bolts 416 can also extend through the bracket into a housing, seat and/or other mounting structure 412 to secure the bracket 156 accordingly. As illustrated in FIG. 5B, the mounting plate 414 can be positioned within a pocket of airbag fabric 590 formed below and outside a main interior volume of the airbag 154 where air or other gas is introduced to inflate the airbag 154.

In some embodiments, the inflator 430 can be spaced apart from the airbag assembly 128 (e.g., remotely located away from the airbag assembly 128 and/or housing 120) and fluidly coupled thereto using a gas delivery hose and/or other suitable fluid passageway or conduit. The gas delivery hose can include a first end fitting in fluid communication with the interior of the airbag and a second end fitting (not shown) (e.g., an inflator connector as disclosed in U.S. Pat. No. 8,439, 398, entitled "INFLATOR CONNECTORS FOR INFLATABLE PERSONAL RESTRAINTS AND ASSOCIATED SYSTEMS AND METHODS," which is incorporated herein by reference in its entirety) threadably or otherwise engaged with an outlet of the inflator 430.

Referring to FIG. 4A, the electronics module assembly 432 includes a processor 444 that receives electrical power from a power source 446 (e.g., one or more lithium batteries), a deployment circuit 452 that initiates the inflator 430, and at least one crash sensor 448 that detects rapid decelerations and/or other crash events. The crash sensor 448, for example, can include a spring-mass-damper type sensor with an inertial switch calibrated for the vehicle's operating environments that initiates airbag deployment upon a predetermined deceleration level. In other embodiments, the crash sensor 448 can include other suitable types of sensors known in the art. Optionally, the electronics module assembly 432 can also include one or more magnetic field sensors 450 that detect the presence of an external magnetic field (e.g., from a speaker) and communicate with the processor 444 to deactivate the crash sensor 448 and prevent inadvertent deployment of the airbag assembly 428. The magnetic field sensor 450 can include, for example, the circuitry disclosed in U.S. Pat. No. 6,535,115, entitled "AIRBAG HAVING EXCESSIVE EXTERNAL MAGNETIC FIELD PROTECTION CIRCUITRY," which is incorporated herein by reference in its entirety.

In some embodiments, some of the components of the electronics module assembly 432 may be omitted. In certain embodiments, for example, the electronics module assembly 432 can include only the power source 446 and the crash sensor 448, which completes a circuit to activate the inflator 430 during a crash event. The components of the electronics module assembly 432 can be housed in a protective cover (e.g., a machined or injection-molded plastic box) that can reduce the likelihood of damaging the electronics module assembly 432 and a magnetic shield that can prevent the electronics module assembly 432 from inadvertently deploying the airbag assembly 128. In other embodiments, the electronics module assembly 432 can be stored in the housing disclosed in U.S. patent application Ser. No. 13/608,959, entitled "ELECTRONICS MODULE ASSEMBLY FOR INFLATABLE PERSONAL RESTRAINT SYSTEM AND ASSOCIATED METHODS," which is incorporated herein by reference in its entirety, and/or other suitable electronics housings known in the art. In further embodiments, the electronics module assembly 432 can include diagnostic testing features, such as those described in U.S. patent application Ser. No. 13/174,659, entitled "INFLATABLE PERSONAL RESTRAINT SYSTEMS" and U.S. Pat. No. 8,818,759, entitled "COMPUTER SYSTEM FOR REMOTE TESTING OF INFLATABLE PERSONAL RESTRAINT SYSTEMS," which are incorporated herein by reference in their entireties.

In some embodiments, the electronics module assembly 432 can positioned in a remote location from the airbag assembly 428 and coupled to the inflator 430 via suitable electrical connectors, for example, a cable as described below. The electronics module assembly 432 can be positioned inside a seat or other mounting structure in the aircraft. When mounted remotely, the electronics module assembly 432 can be positioned to properly transmit the crash signal and reduce vibration effects.

During a crash event above a predetermined threshold, the crash sensor 448 can close one or more switches, thereby causing the processor 444 to send a corresponding signal to the deployment circuit 452. Upon receiving a signal from the processor 444, the deployment circuit 452 can apply a sufficient voltage to an igniter (e.g., a squib) that causes the inflator 430 to discharge its compressed gas into the airbag 154. The expansion of the compressed gas inflates the airbag 154 and causes it to deploy through the opening 126 in the housing 120 (not shown in FIG. 4). The door 134 or cover (if provided with one) moves away from the opening 126 (e.g., due to the force applied by the inflating airbag 154), allowing the airbag 154 to initially expand upward and away from the occupant in the corresponding rear seat, then in a longitudinal or horizontal direction, and then finally moving in a downward direction.

Figure 6B:
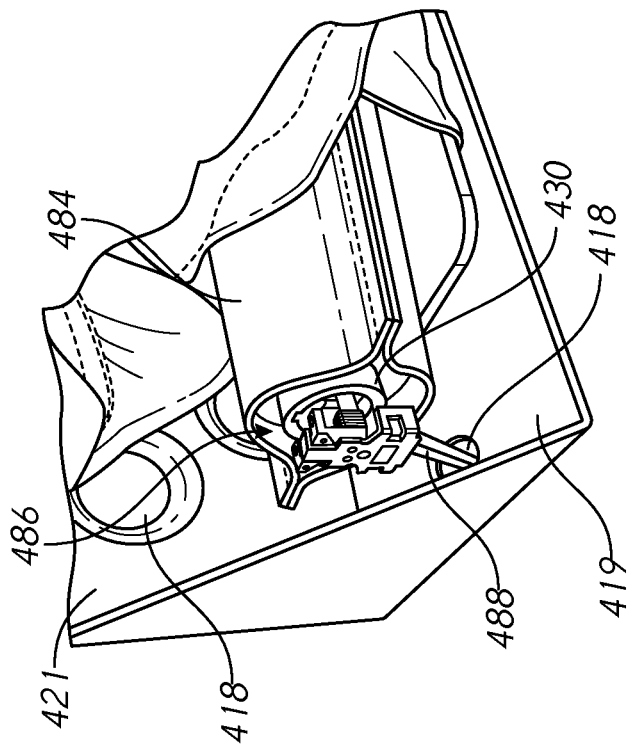
FIG. 6B is an enlarged isometric view of a portion of an airbag assembly configured in accordance with another embodiment of the present technology.
Figure 6A:
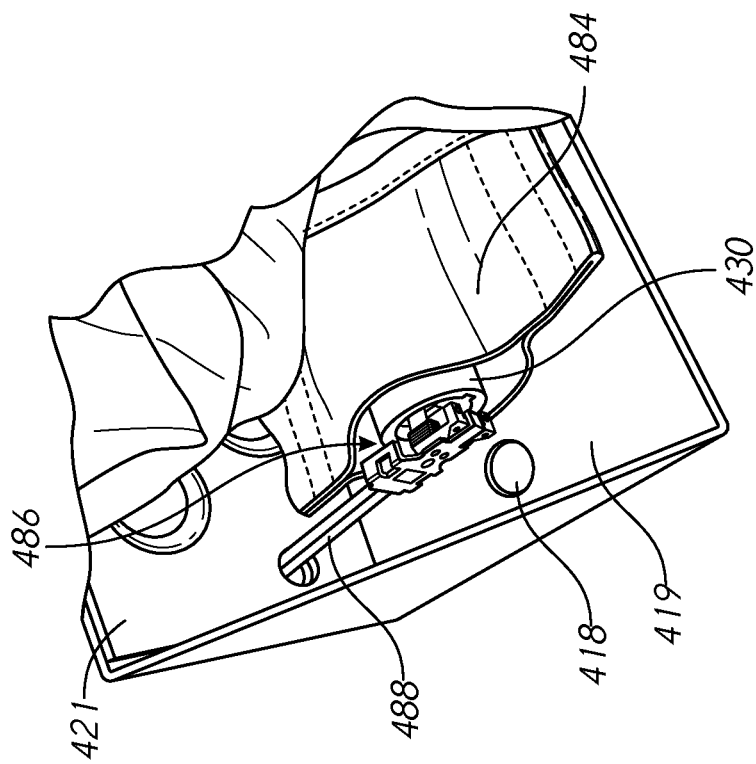
FIG. 6A is an enlarged isometric view of a portion of an airbag assembly configured in accordance with an embodiment of the present technology.

FIGS. 6A-6B are enlarged isometric views of a portion of the airbag assembly 128 configured in accordance with embodiments of the present technology. In both embodiments, the first end 486 of the inflator 430 can be connected to a first end of the cable 488. A second end of the cable 488 is connected to the electronics module assembly 432 to operably connect the electronics module assembly 432 to the inflator 430. The second opposite end 491 of the inflator 430 can include the diffuser 489 for introducing air or other gases to inflate the airbag 154. FIG. 6A illustrates that the cable 488 can extend through the vertically extending plate 421 to connect to the electronics module assembly 432 located remotely from the airbag assembly 128. The embodiment of FIG. 6B is substantially similar to the embodiment of FIG. 6A, however, the cable 488 extends through the base plate 419 to operably connect the electronics module assembly 432 to the inflator 430.

Figure 7A:
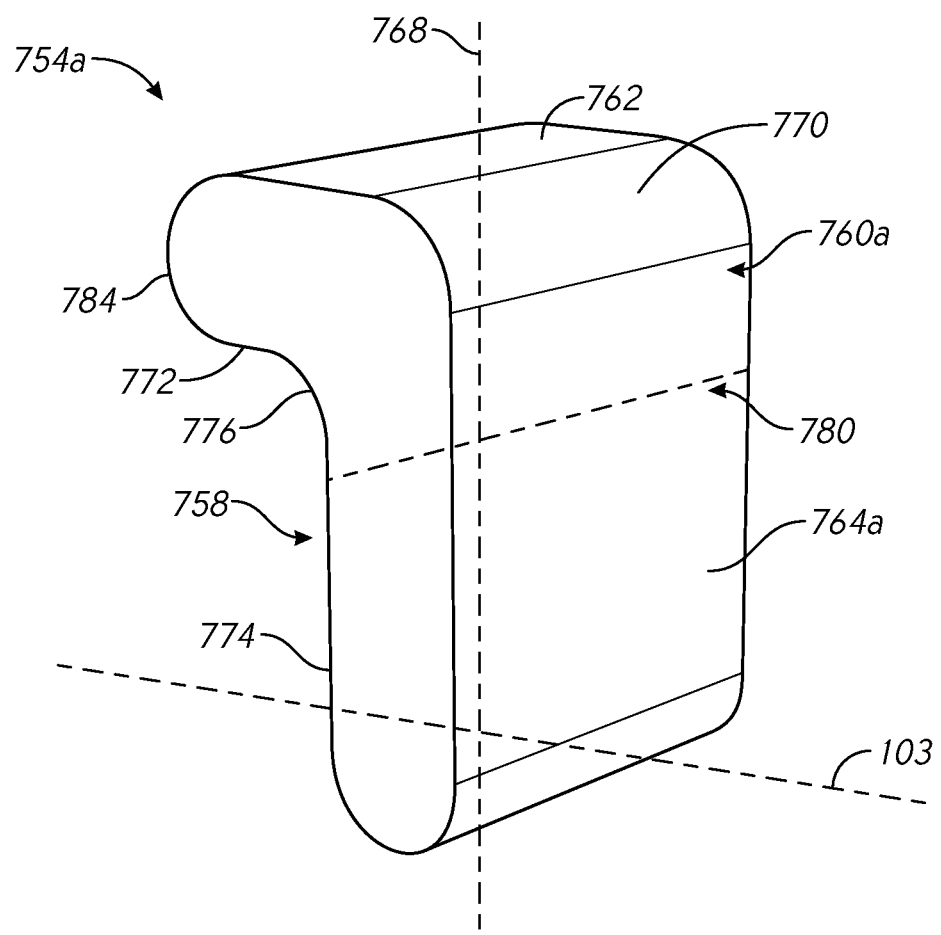
FIG. 7A is a rear isometric view of a deployed airbag configured in accordance with an embodiment of the present technology.
Figure 7B:
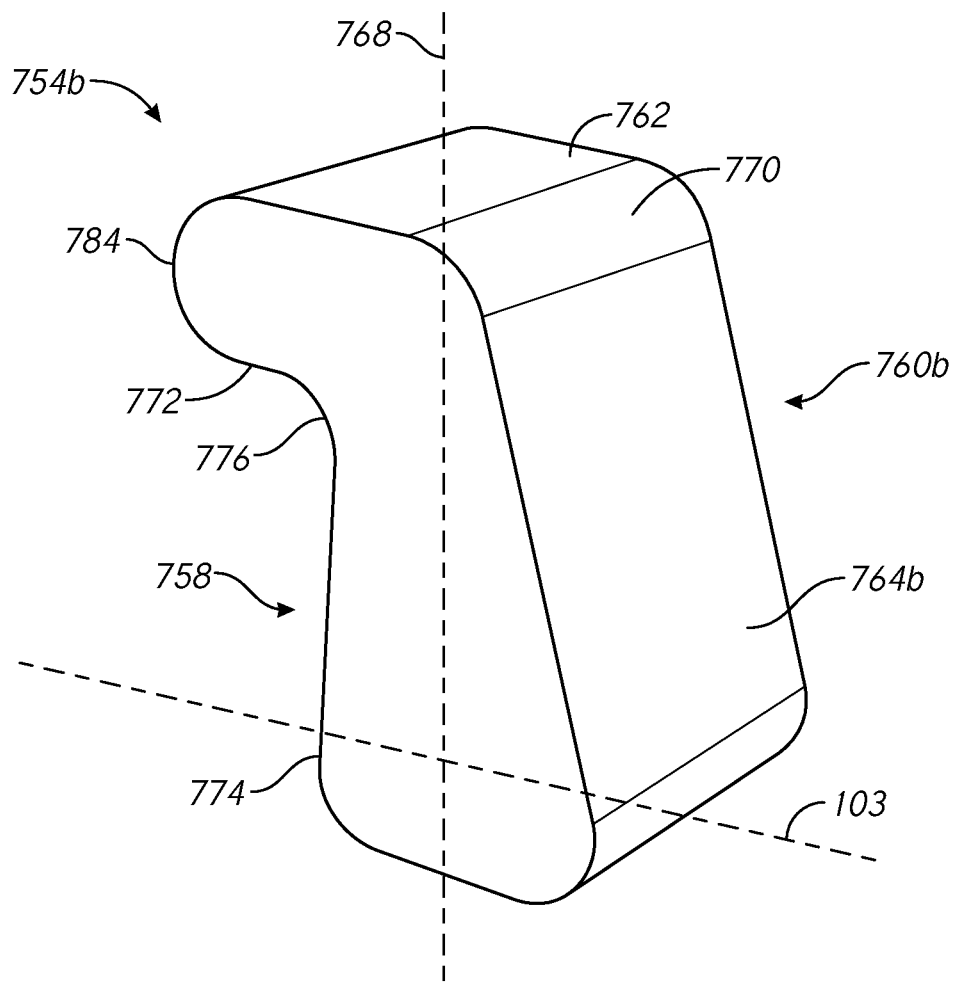
FIG. 7B is a rear isometric view of a deployed airbag configured in accordance with another embodiment of the present technology.

FIGS. 7A and 7B are rear isometric views of airbags 754a and 754b, respectively, configured in accordance with embodiments of the present technology. The embodiment illustrated in FIG. 7B is substantially similar to the embodiment of FIG. 7A. However, the airbag 754b has a slightly different shape than the airbag 754a. In FIG. 7A, the airbag 754a is shown in a deployed (e.g., an inflated) position. The airbag 754a can be stowed and/or folded in any suitable location prior to deployment. For example, when stowed within the cavity 124 of the housing 120, the airbag 754a deploys through the opening 126 (e.g., to deploy initially upward and/or away from the occupant 101). The airbag 154 can have a similar or identical configuration as airbags 754a or 754b.

As illustrated in FIG. 7A, the airbag 754a has a generally inverted L-shaped cross-sectional configuration. When fully deployed, the airbag 754a includes a forward facing surface 758 and a rearward facing surface 760a relative to the longitudinal axis 103 (FIG. 1) of the aircraft. The rearward facing surface 760a includes a first generally planar surface portion 764a that extends at or about 90 degrees relative to an upward facing generally planar second surface portion 762. The first surface portion 764a extends generally parallel to a vertical axis 768 extending between a top and bottom of the aircraft and the second surface portion 762 extends generally perpendicular to the vertical axis 768. A third curved surface portion 770 extends between the first and second surface portions 764a, 762.

The forward facing surface 758 includes a fourth generally planar surface portion 774 that extends generally parallel to the first surface portion 764 and at or about 90 degrees relative to a downward facing generally planar fifth surface portion 772. The fourth surface portion 774 is positioned forward of the first surface portion 764. A sixth curved surface portion 776 extends between the fourth and fifth surface portions 774, 772. The second surface portion 762 is oriented generally upward (e.g., towards an aircraft ceiling) and the first surface portion 764a is oriented generally rearward (e.g., towards the rear of the aircraft and a seated occupant 101). The fifth surface portion 772 extends generally parallel to the second surface portion 762 but faces downward.

A seventh curved portion 784 of the airbag 754a, located forward of both the first and fourth surface portions 764a, 774, extends between the second and fifth surface portions 762, 772. The first surface portion 764a and/or fourth surface portion 774 can be folded or rolled along a seam 780 such that the first, third, fourth and/or sixth surface portions extend generally parallel to each other and/or are stacked, rolled or layered on each other when the airbag 754a is stowed, folded and/or not inflated, as described below with reference to FIGS. 8A-10G. Generally, the airbag 754a can be used with economy class seats in a commercial or other aircraft (e.g., where rows of seats and adjacent seats are positioned relatively close together relative to business class seats, seats are narrower, seats can only minimally recline, and/or minimal electronics or other objects are positioned in front of a seated occupant).

As illustrated in FIG. 7B, the airbag 754b includes a slightly different, generally inverted L-shaped cross-sectional configuration from the airbag 754a. When fully deployed, the airbag 754b includes a forward facing surface 758 and a rearward facing surface 760b relative to the longitudinal axis 103. However, the rearward facing surface 760b includes a first generally planar surface portion 764b that extends at or about a non-90 degree angle relative to a second generally planar upward facing surface portion 762 resulting in a sloped first planar surface portion 764b which can increase the size of the airbag 754b relative to the airbag 754a. A third surface portion 770 (e.g., curved) extends between the first and second surface portions 764b, 762. The forward facing surface 758 includes fourth and fifth generally planar surface portions 774, 772 that extend at or about 90 degrees relative to each other.

Generally, the airbag 754b can be used with business class seats in a commercial or other aircraft (e.g., where rows of seats and adjacent seats are positioned farther apart than in economy class, less seats are adjacent to each other (e.g., two seats versus three seats in a row), seats are wider, seats can fully recline or more so than in economy class, and/or more electronics or other objects are positioned in front of a seated occupant). As the pitch or distance between rows of seats (or distance between a seat and monument positioned forward of the seat) increases, a larger airbag may be required to cushion the impact of an occupant during a crash or deceleration event. Airbags with configurations such as airbag 754b may be required in these contexts rather than configurations such as airbag 754a.

FIGS. 8A-8I illustrate a series of side views of various stages of folding the airbag 154 for storage within the housing 120 in accordance with embodiments of the present technology. The airbag 154 can include the inflator 430 and be secured to a mounting bracket 156 as described above. The airbag 154 can be secured to the mounting bracket 156 and positioned within the housing 120 with the door 134 closed to conceal the airbag 154 once the airbag is rolled and stowed. The housing 120 is shown as transparent in FIGS. 8A-8I to illustrate how the airbag 154 is folded and stowed.

As shown in FIG. 8A, when fully deployed and inflated, the airbag 154 has a generally inverted L-shaped configuration having a similar or identical configuration as the airbag 754a of FIG. 7A. For example, the airbag 154 includes a forward facing surface 758 and a rearward facing surface 760 relative to the longitudinal axis 103 (FIG. 1) of the aircraft. The rearward facing surface 760 includes a first generally planar surface portion 764 that extends at or about 90 degrees relative to an upward facing generally planar second surface portion 762. The airbag 154 includes an upper portion 278 and a lower portion 282. Referring next to FIG. 8B, the first planar surface portion 764 can be folded inward and upward forming a curved ledge, projection, or overhang portion 892 extending forward from a remaining vertically extending portion 886 of the first planar surface portion 864. An inverted U-shaped, curved portion 888 adjacent the upper portion 278 extends between the portions 892 and 886.

As illustrated in FIGS. 8C-8E, beginning with a bottom end of lower portion 282 of the airbag 154, the airbag 154 can be rolled multiple times. When the rolled airbag 154 reaches the overhang portion 892, the airbag 154 can be rolled over the overhang portion 192 as illustrated in FIGS. 8F-8G. The airbag 154 can be rolled until it reaches the configuration shown in FIG. 8I. In the fully rolled or stowed configuration, the forward facing surface 758 is oriented rearward and upward when the airbag 154 is stored in position in the housing 120. The surface 758 is positioned above the upper portion 278 of the airbag 154. When fully rolled and stored in position, the door 134 can be closed to conceal the airbag 154.

Figure 9:
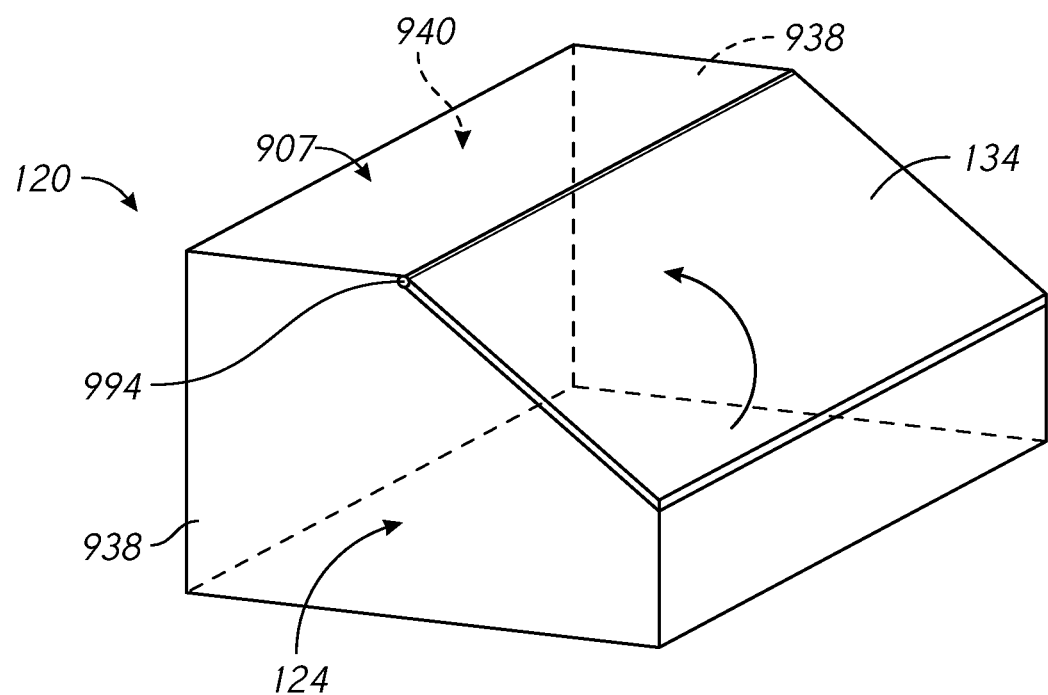
FIG. 9 is an isometric view of a housing configured in accordance with an embodiment of the present technology.

FIG. 9 is an isometric view of the housing 120 in which the airbag 154 can be stowed in configured in accordance with an embodiment of the present technology. The housing 120 can be formed by a plurality of plates 907 including opposing side plates or sidewalls 938 mounted or secured to a rear plate 940 to form the cavity 124 the airbag 154 can be positioned within. The plurality of plates 907 can be welded together or secured with suitable fasteners (e.g., screws, nuts, bolts, pins). Additionally, the plurality of plates 907 can be secured to the seat 102B or other mounting structure (e.g., a fixed mounting structure) within the aircraft interior with other suitable fasteners (e.g., straps, U-bolts, etc.). The housing 120 can include one or more hinges 994 that allow the door 134 to rotate between open and closed positions.

Figure 10C:
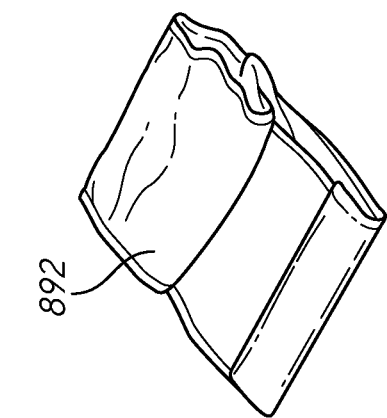
FIGS. 10A-10G are a series of isometric views illustrating various stages of folding an airbag for storage in accordance with an embodiment of the present technology.
Figure 10G:
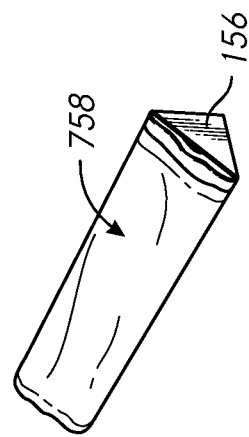
Figure 10B:
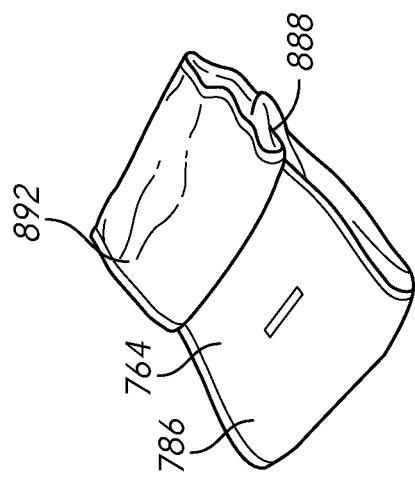
Figure 10F:
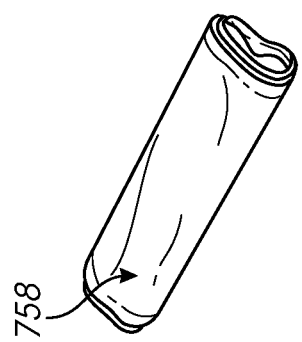
Figure 10A:
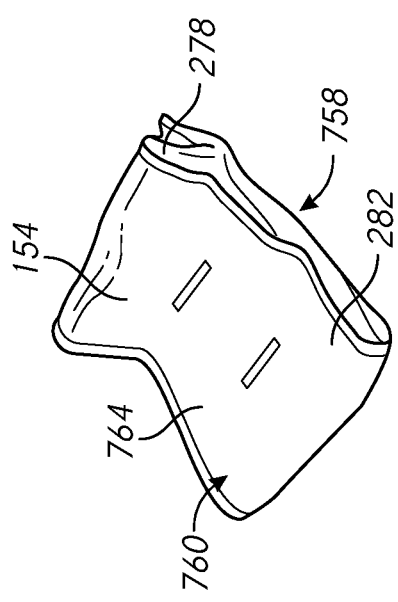
Figure 10E:
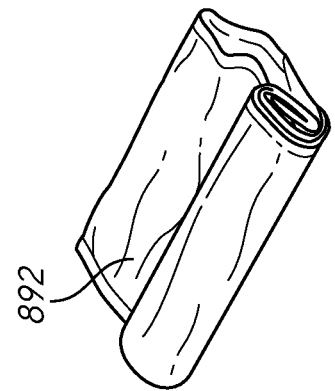
Figure 10D:
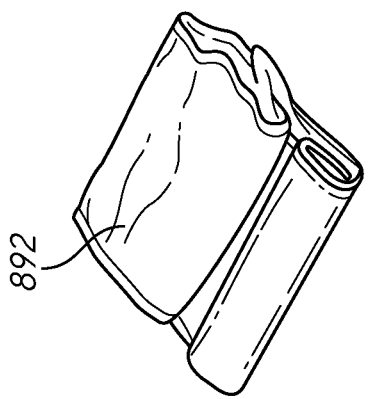

FIGS. 10A-10G illustrate a series of perspective views of stages of folding of the airbag 154 with the bracket 156 and housing 120 removed. The airbag 154 is rolled in a similar fashion as shown in FIGS. 8A-8I and can include similar features. Once completely or fully rolled, as illustrated in FIG. 10F, the airbag 154 can be positioned within and secured to bracket 156, as illustrated in FIG. 10G.

From the foregoing, it will be appreciated that specific embodiments have been described herein for purposes of illustration, but that modifications may be made without deviating from the spirit and scope of the various embodiments of the present technology. The airbag systems illustrated in FIGS. 1-10G can include, for example, additional airbags assemblies 128 and/or inflators 430 operably coupled to the electronics module assembly 432 for use with the additional aircraft seats (e.g., within the same row as the seat 102 or another row of forward-facing seats). In some embodiments, the airbag systems or components thereof can be used with seats that are not forward-facing (e.g., angled or side-facing seats). In various other embodiments, the housing 120 may be omitted and the airbag assembly can be mounted directly to a portion of the aircraft cabin (e.g., the seat, wall, etc.). In some embodiments, while airbags with generally L-shaped configurations are illustrated, different suitable shapes can be used. Specific elements of any of the foregoing embodiments can also be combined or substituted for elements in other embodiments. Moreover, the airbag systems described above can be incorporated in non-aircraft systems, such as land vehicle systems, watercraft, etc. Furthermore, while advantages associated with certain embodiments of the present technology have been described in the context of these embodiments, other embodiments may also exhibit such advantages, and not all embodiments need necessarily exhibit such advantages to fall within the scope of the technology. Accordingly, the present technology is not limited, except as by the appended claims.

We claim:

1. An airbag system for use with an aircraft seat, the airbag system comprising:
   an airbag stowed in a housing positioned forward of the aircraft seat and above a strike area associated with the aircraft seat, wherein the airbag includes an upper portion and a lower portion, wherein, in response to a crash event, the upper portion is configured to inflate proximate the housing and deploy in a generally upward direction away from the strike area, the lower portion is configured to inflate from the upper portion and deploy in a generally horizontal direction to an upper position above the strike area, and after the lower portion has inflated and deployed to the upper position, the lower portion is configured to move downwardly from the upper position to a lower position between the strike area and an occupant seated in a generally upright position in the aircraft seat.

2. The airbag system of claim 1 wherein the lower portion moves from a generally horizontal orientation in the upper position to a generally vertical orientation in the lower position.

3. The airbag system of claim 1 wherein the upper portion is configured to extend in a generally horizontal direction and the lower portion is configured to extend in a generally vertical direction when the airbag is fully deployed.

4. The airbag system of claim 1 wherein the aircraft seat is a first forward-facing seat, and wherein the airbag housing is mounted to an upper portion of a second forward-facing seat positioned forward of the first seat.

5. The airbag system of claim 1 wherein the aircraft seat is a forward-facing seat, and wherein the airbag housing is mounted to a fixed structure positioned forward of the aircraft seat in an interior of the aircraft.

6. An airbag system for use with an aircraft seat, the airbag system comprising:
   an airbag stowed in a position forward of the aircraft seat and above a strike area associated with the aircraft seat, wherein the airbag is configured to inflate and deploy in a generally upward direction away from the strike area, and then downwardly to a position between the strike area and an occupant seated in a generally upright position in the aircraft seat, in response to a crash event.

7. The airbag system of claim 6 wherein the airbag is configured to deploy downwardly to a position adjacent to a back portion of an occupant seated in a brace position in the aircraft seat.

8. The airbag system of claim 6 wherein the aircraft seat is a forward-facing seat relative to a longitudinal axis of the aircraft.

9. The airbag system of claim 6 wherein the aircraft seat is a first forward-facing seat, and wherein the airbag is mounted to an upper portion of a second forward-facing seat positioned forward of the first seat.

10. The airbag system of claim 6 wherein the aircraft seat is a forward-facing seat, and wherein the airbag is mounted to a fixed structure positioned forward of the aircraft seat in an interior of the aircraft.

11. The airbag system of claim 6 wherein the airbag is configured to deploy in a generally horizontal direction after deploying in the generally upward direction and before deploying in the generally downward direction.

12. The airbag system of claim 6 wherein the airbag is configured to deploy in a generally horizontal direction toward the aircraft seat after deploying in the generally upward direction and before deploying in the generally downward direction.

13. The airbag system of claim 6 wherein the airbag has a generally inverted L-shaped cross-sectional shape.

14. The airbag system of claim 6 wherein the airbag includes a first portion and a second portion, wherein the first portion is configured to extend generally perpendicular to the second portion when the airbag is fully deployed.

15. The airbag system of claim 6 wherein the airbag includes a first portion and a second portion, wherein the first portion is configured to extend in a generally horizontal direction, and the second portion is configured to extend downwardly in a generally vertical direction, when the airbag is fully deployed.

16. The airbag system of claim 6, further comprising a housing having an opening positioned forward of the aircraft seat, wherein the airbag is stowed in the housing and configured to deploy through the opening in response to the crash event.

17. The airbag system of claim 16, further comprising an inflator positioned within the housing in fluid communication with the airbag to provide gas for inflating the airbag in response to the crash event.

18. The airbag system of claim 16, further comprising an inflator remotely located from the housing in fluid communication with the airbag to provide gas for inflating the airbag in response to the crash event.

19. An airbag system for use with an aircraft seat, the airbag system comprising:

an airbag stowed above a strike hazard forward of the aircraft seat; and means for deploying the airbag in a generally upward direction away from the strike hazard, and then downwardly to a position between the strike hazard and an occupant seated in the aircraft seat to protect the occupant during a crash event, wherein deploying the airbag protects the occupant from striking the hazard forward of the aircraft seat when the occupant is seated in an upright orientation during the crash event, and wherein deploying the airbag avoids inflating the airbag against the occupant when the occupant is seated in an out-of-position orientation during the crash event.

20. The airbag system of claim 19 wherein the out-of-position orientation is a brace position.

21. A method of deploying an airbag between a strike hazard positioned forward of an aircraft seat and an occupant seated in the aircraft seat, the method comprising:

detecting a deceleration event above a preset magnitude; and inflating the airbag from a housing positioned above the strike hazard in response to detecting the deceleration event, wherein inflating the airbag includes initially deploying the airbag from the housing in an upwardly direction away from the strike hazard, and then deploying the airbag in a downwardly direction toward the strike hazard to position the airbag between the strike hazard and the occupant seated in the aircraft seat.

22. The method of claim 21, wherein inflating the airbag further comprises deploying the airbag in a generally horizontal rearward direction toward the aircraft seat after deploying the airbag in the upwardly direction and before deploying the airbag in the downwardly direction.

23. The method of claim 21 wherein inflating the airbag further comprises inflating the airbag above the occupant if the occupant is seated in a brace position.

* * * * *